(12) United States Patent
Meaige et al.

(10) Patent No.: US 11,148,730 B2
(45) Date of Patent: Oct. 19, 2021

(54) VEHICLE FRAME CONSTRUCTION AND METHOD

(71) Applicant: Honda Motor Co., Ltd., Tokyo (JP)

(72) Inventors: Benjamin J. Meaige, Powell, OH (US); Derik Thomas Voigt, Dublin, OH (US); Eric J. Boettcher, Columbus, OH (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 16/786,205

(22) Filed: Feb. 10, 2020

(65) Prior Publication Data
US 2020/0172174 A1 Jun. 4, 2020

Related U.S. Application Data

(62) Division of application No. 15/302,541, filed as application No. PCT/US2015/024669 on Apr. 7, 2015, now Pat. No. 10,597,094.

(60) Provisional application No. 61/977,182, filed on Apr. 9, 2014, provisional application No. 61/977,185, filed on Apr. 9, 2014, provisional application No. 61/977,178, filed on Apr. 9, 2014.

(51) Int. Cl.
B62D 29/00 (2006.01)
B62D 25/04 (2006.01)
B29C 44/18 (2006.01)
B62D 25/02 (2006.01)
B29C 44/12 (2006.01)

(52) U.S. Cl.
CPC .......... B62D 29/002 (2013.01); B29C 44/128 (2013.01); B29C 44/18 (2013.01); B62D 25/025 (2013.01); B62D 25/04 (2013.01); B62D 29/005 (2013.01)

(58) Field of Classification Search
CPC .... B62D 29/002; B62D 25/025; B62D 25/04; B62D 29/005; B29C 44/128; B29C 44/18
USPC .............................. 296/187.02, 209, 193.06
See application file for complete search history.

(56) References Cited

U.S. PATENT DOCUMENTS

| | | | |
|---|---|---|---|
| 4,741,945 A | 5/1988 | Brant et al. |
| 5,755,486 A | 5/1998 | Wycech |
| 6,079,180 A | 6/2000 | Wycech |
| 6,092,864 A | 7/2000 | Wycech et al. |
| 6,096,403 A | 8/2000 | Wycech |
| 6,131,897 A | 10/2000 | Barz et al. |
| 6,305,136 B1 | 10/2001 | Hopton et al. |
| 6,341,467 B1 | 1/2002 | Wycech |
| 6,419,305 B1 | 7/2002 | Larson |
| 6,475,577 B1 | 11/2002 | Hopton et al. |

(Continued)

FOREIGN PATENT DOCUMENTS

JP 2010064505 3/2010

OTHER PUBLICATIONS

International Search Report and Written Opinion of PCT/US2015/024669 dated Sep. 18, 2015, 14 pages.

Primary Examiner — Joseph D. Pape
(74) Attorney, Agent, or Firm — Rankin, Hill & Clark LLP

(57) ABSTRACT

A vehicle frame construction and method includes an elongated hollow frame member having a plurality of interior sides and a reinforcement member. The reinforcement member is formed from a thermoplastic polymer and is installed so as to be arranged within the elongated hollow frame member to reinforce each interior side of the elongated hollow frame member in a plane orthogonally oriented relative to a longitudinal axis of the elongated hollow frame member.

21 Claims, 17 Drawing Sheets

(56) References Cited

U.S. PATENT DOCUMENTS

| | | |
|---|---|---|
| 6,619,727 B1 | 9/2003 | Barz et al. |
| 6,729,425 B2 | 4/2004 | Schneider et al. |
| 6,777,049 B2 | 8/2004 | Sheldon et al. |
| 6,786,533 B2 | 9/2004 | Bock et al. |
| 6,793,274 B2 | 9/2004 | Riley et al. |
| 6,896,320 B2 | 5/2005 | Kropfeld |
| 6,923,499 B2 | 8/2005 | Wieber et al. |
| 6,941,719 B2 | 9/2005 | Busseuil et al. |
| 7,105,112 B2 | 9/2006 | Czaplicki et al. |
| 7,296,847 B2 | 11/2007 | Czaplicki et al. |
| 2004/0159481 A1 | 8/2004 | Schneider et al. |
| 2005/0082111 A1 | 4/2005 | Weber |
| 2005/0082878 A1 | 4/2005 | Yamada et al. |
| 2005/0276970 A1 | 12/2005 | Busseuil et al. |
| 2006/0008615 A1 | 1/2006 | Muteau et al. |
| 2007/0101679 A1 | 5/2007 | Harthcock et al. |
| 2008/0202674 A1 | 8/2008 | Schneider et al. |
| 2008/0217960 A1 | 9/2008 | Kochert et al. |
| 2009/0085379 A1 | 4/2009 | Takahashi et al. |
| 2011/0104413 A1 | 5/2011 | Mendibourne et al. |
| 2012/0235442 A1 | 9/2012 | Ezzat et al. |

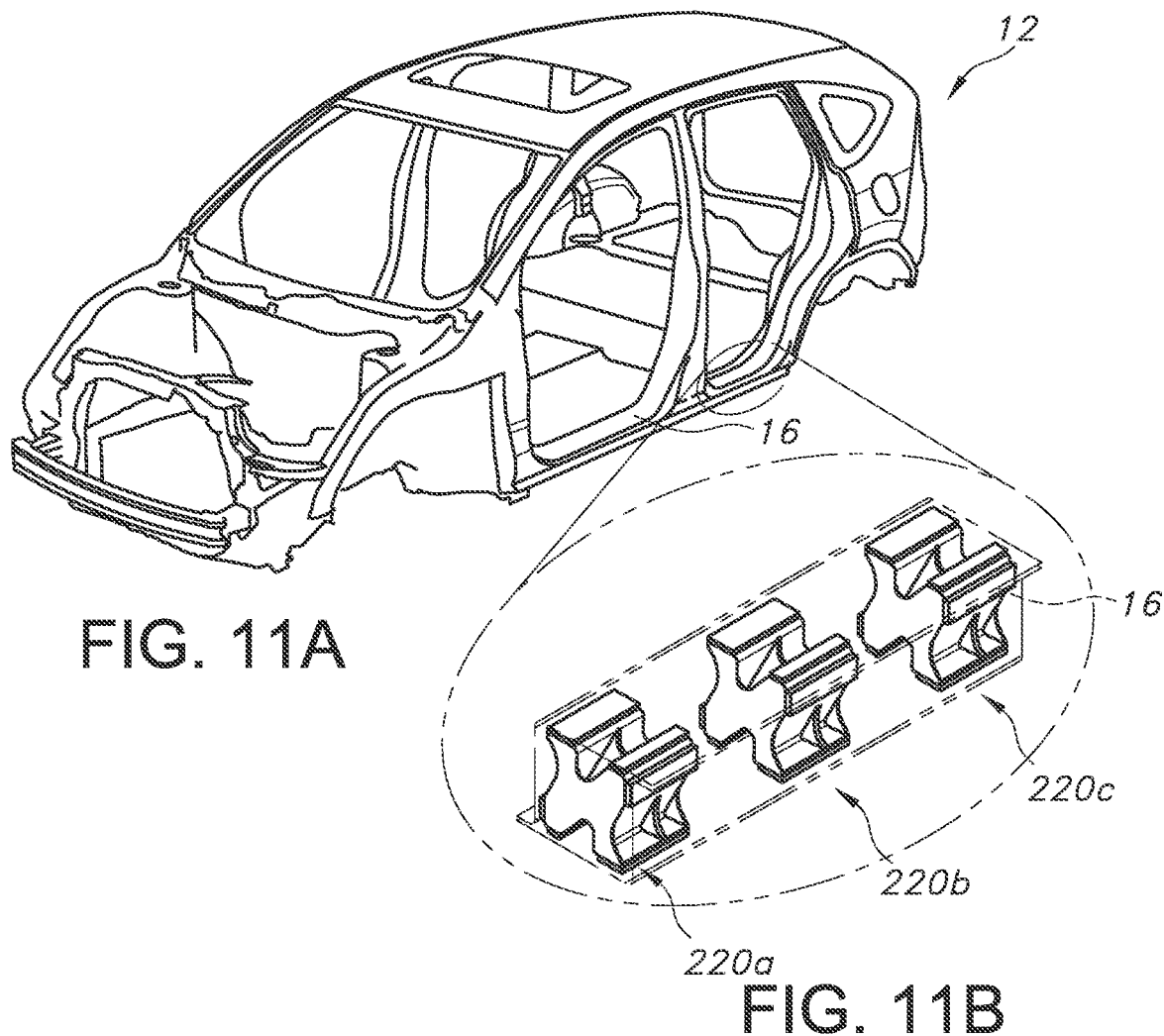
FIG. 11A
FIG. 11B
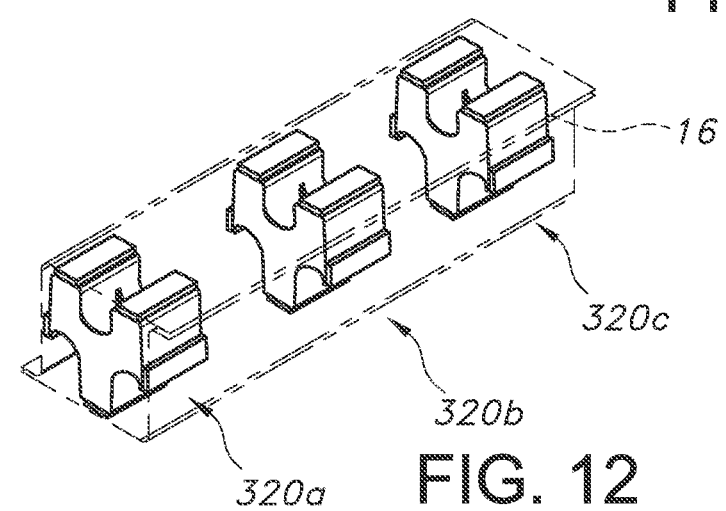
FIG. 12

VEHICLE FRAME CONSTRUCTION AND METHOD

This application claims the benefit of U.S. patent application Ser. No. 15/302,541, filed Oct. 7, 2016, which is a 371 of international application PCT/US2015/024669, filed Apr. 7, 2015, which claims benefit of U.S. provisional patent application Ser. No. 61/977,182, filed Apr. 9, 2014, U.S. provisional patent application Ser. No. 61/977,185, filed Apr. 9, 2014, U.S. provisional patent application Ser. No. 61/977,178, filed Apr. 9, 2014, each of which is expressly incorporated by reference herein in its entirety.

BACKGROUND

Vehicle frames and constructions therefore are increasingly complex as vehicle manufacturers look for new ways to improve structural integrity of the vehicle frame while maintaining and/or reducing the overall weight of the vehicle frame. These are often competing concerns. That is, increasing the structural integrity of the vehicle frame (e.g., improving crash performance) often involves adding weight to the vehicle frame. Conversely, reducing the weight of the vehicle frame must be done carefully so as to avoid adversely changing the structural integrity of the vehicle frame. A number of technologies and methods are known for improving the integrity of the vehicle frame and some of these are also concerned with limiting the amount of weight added to the vehicle frame.

SUMMARY

According to one aspect, a vehicle frame construction includes an elongated hollow frame member having a plurality of interior sides and a reinforcement member. The reinforcement member is formed from a thermoplastic polymer and is arranged within the elongated hollow frame member to reinforce each interior side of the elongated hollow frame member in a plane orthogonally oriented relative to a longitudinal axis of the elongated hollow frame member with recesses defined in the reinforcement member such that the reinforcement member is spaced apart from each interior side along portions thereof.

According to another aspect, a vehicle frame member assembly includes an elongated hollow frame member and a nylon reinforcement member arranged within the elongated hollow frame member to reinforce each interior side of the elongated hollow frame member in a plane orthogonally oriented relative to a longitudinal axis of the elongated hollow frame member. The reinforcement member has one of an N-shape or a Y-shape in the plane.

According to a still another aspect, a vehicle frame construction method includes providing an elongated hollow frame member having a plurality of interior sides, providing a reinforcement member formed from a thermoplastic polymer and installing the reinforcement member within the elongated hollow frame member. The reinforcement member has a plurality of longitudinally extending recesses and the installation of the reinforcement member within the elongated hollow frame member reinforces each interior side of the elongated hollow frame member in a plane orthogonally oriented relative to a longitudinal axis of the elongated hollow frame member. Also, the recesses spacing portions of the reinforcement member apart from the interior sides of the elongated hollow frame member.

According to still yet another aspect, a vehicle frame construction includes an elongated hollow frame member having a plurality of interior sides and a reinforcement member. The reinforcement member is formed from a thermoplastic polymer and is arranged within the elongated hollow frame member to reinforce each interior side of the elongated hollow frame member in a plane orthogonally oriented relative to a longitudinal axis of the elongated hollow frame member. The reinforcement member has contact portions arranged adjacent each of the plurality of interior sides.

According to yet another aspect, a vehicle frame construction method includes providing an elongated hollow frame member having a plurality of interior sides, providing a reinforcement member formed from a thermoplastic polymer and installing the reinforcement member within the elongated hollow frame member. The installation of the reinforcement member within the elongated hollow frame member reinforces each interior side of the elongated hollow frame member in a plane orthogonally oriented relative to a longitudinal axis of the elongated hollow frame member. The reinforcement member has contact portions arranged adjacent each of the plurality of interior sides.

According to a still further aspect, a vehicle frame member assembly includes an elongated hollow frame member and a plurality of nylon reinforcement members arranged in a spaced apart pattern within the elongated hollow frame member to reinforce each interior side of the elongated hollow frame member in a plane orthogonally oriented relative to a longitudinal axis of an elongated hollow frame member. Each of the reinforcement members has contact portions arranged adjacent each of the plurality of interior sides.

According to another aspect, a vehicle frame construction method includes an elongated hollow frame member having a plurality of interior sides, a structural foam member, and acoustic foam. The structural foam member is complementarily molded within the elongated hollow frame member to reinforce each interior side of the elongated hollow frame member. The structural foam member defines a longitudinal throughole. The acoustic foam is injection molded within the longitudinal throughole of the structural foam member.

According to still another aspect, a vehicle frame construction method includes providing an elongated hollow frame member having a plurality of interior sides and complementarily molding a structural foam member within the elongated hollow frame member to reinforce each interior side of the elongated hollow frame member. The structural foam member defines a longitudinal throughole. The method further includes injection molding an acoustic foam within the longitudinal throughole of the structural foam member.

According to a still yet another aspect, a method of reinforcing a vehicle frame member includes installing a structural foam member within an associated elongated hollow frame member for reinforcing the associated elongated hollow frame member. The structural foam member defines a longitudinal throughole. The method also includes injection molding an acoustic foam within the longitudinal throughole of the structural foam member.

BRIEF DESCRIPTION OF THE DRAWINGS

FIG. 11A is a perspective view of a vehicle frame similar to FIG. 1A.

FIG. 11B is a schematic perspective view showing a portion of a side sill member of the vehicle frame of FIG. 9A having a plurality of spaced apart reinforcement members arranged therein.

FIG. 12 is a schematic perspective view similar to FIG. 9B but showing reinforcement members according to an alternate exemplary embodiment spaced within the side sill member.

DETAILED DESCRIPTION

Figures 1A, 1B:
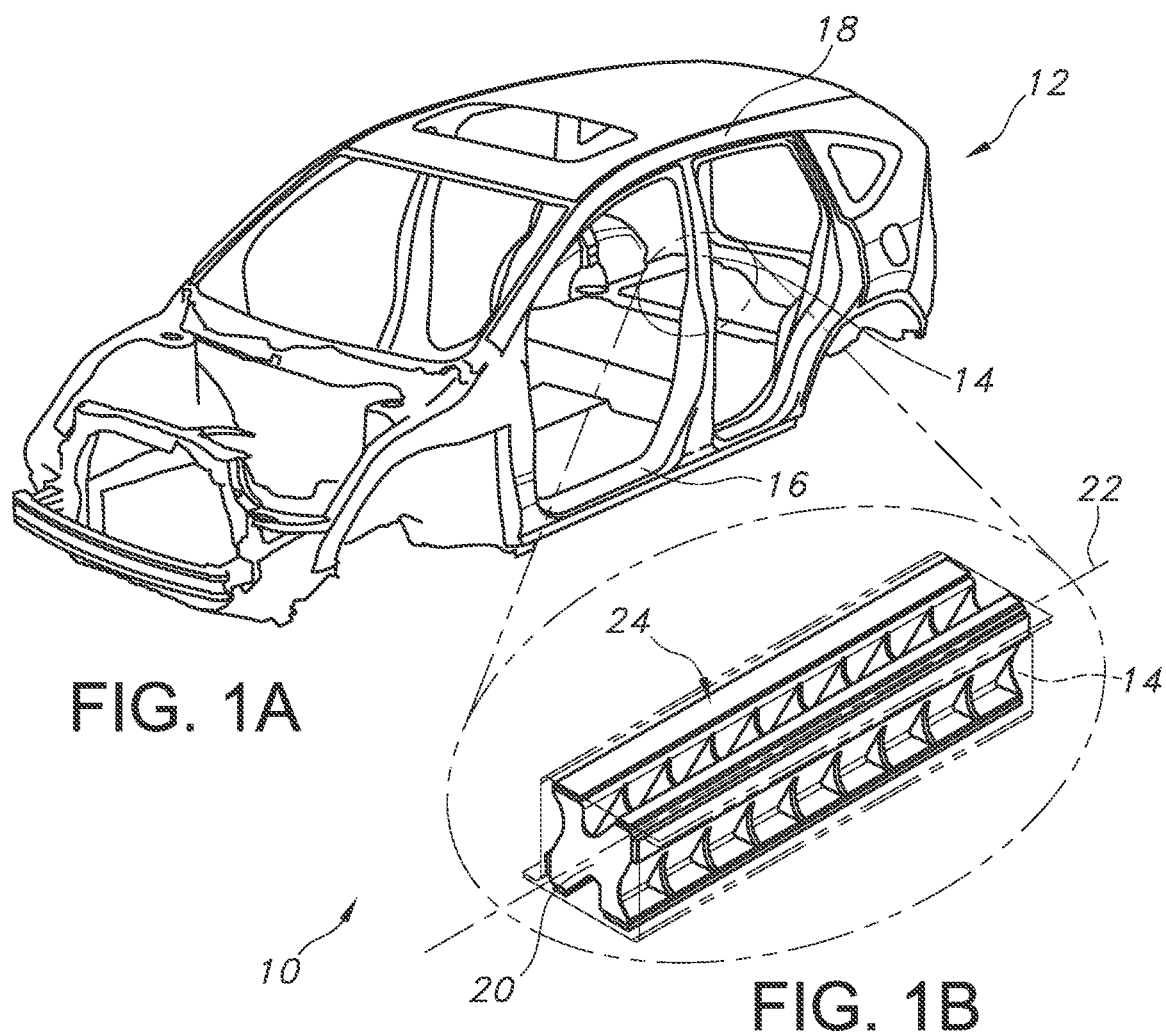
FIG. 1A is a perspective view of a vehicle frame having a pillar member extending upward from a side sill member to a roof rail member.
FIG. 1B is a schematic perspective view showing a portion of the pillar member of the vehicle frame of FIG. 1A with a reinforcement member arranged therein according to an exemplary embodiment.

Referring now to the drawings wherein the showings are for purposes of illustrating one or more exemplary embodiments and not for purposes of limiting the same, FIG. 1A shows a vehicle frame construction 10 including a vehicle frame 12 comprised of a plurality of elongated hollow frame members. One of the elongated hollow frame members is a vertical pillar member 14 extending upward from a side sill member 16 to a roof rail member 18, both optionally formed as additional elongated hollow frame members of the vehicle frame 12. Thus, the elongated hollow frame member 14 is shown in FIG. 1A as the vehicle pillar member (e.g., B-pillar member). Alternatively, the elongated hollow frame member 14 can be another frame member on the vehicle such as the A-pillar or any other pillar member, the roof rail, front or rear frame assembly side members, underside frame members (e.g., cross-members), etc.

With additional reference to FIG. 1B, the vehicle fame construction 10 additionally includes a reinforcement member 20 formed from a thermoplastic polymer and arranged within the elongated hollow frame member 14. In particular, and as will be described in more detail below, the elongated hollow frame member 14 has a plurality of interior sides (e.g., sides 30, 32, 34 and 36 shown in FIGS. 4-6). The reinforcement member 20 is arranged therein to reinforce each interior side of the elongated hollow frame member 14 in a plane orthogonally oriented relative to a longitudinal axis 22 of the elongated hollow frame member 14 with recesses (e.g., recesses 46, 54, 64 and 66 shown in FIGS. 2 and 3) defined in the reinforcement member 20 such that the reinforcement member 20 is spaced apart from each interior side along portions thereof.

Figure 2:
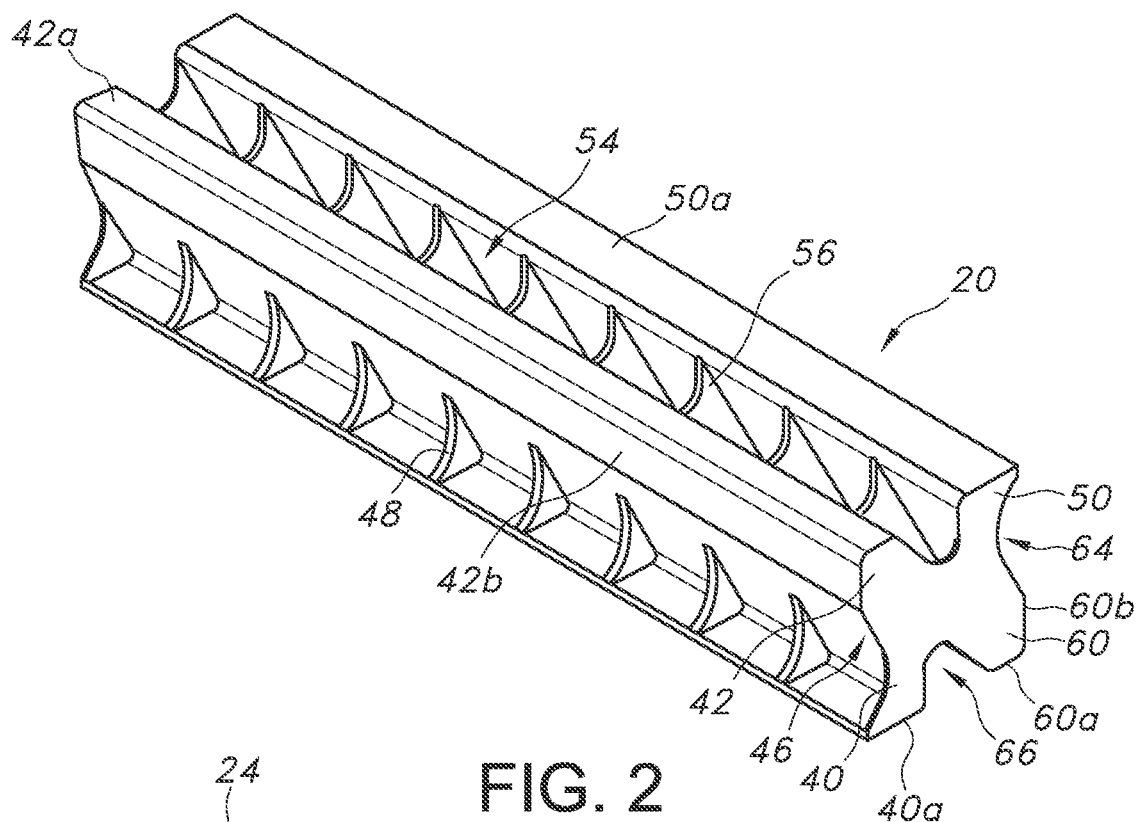
FIG. 2 is a perspective view showing the reinforcement member removed from the pillar member, and shown from an end opposite the end shown in FIG. 1B.
Figure 3:
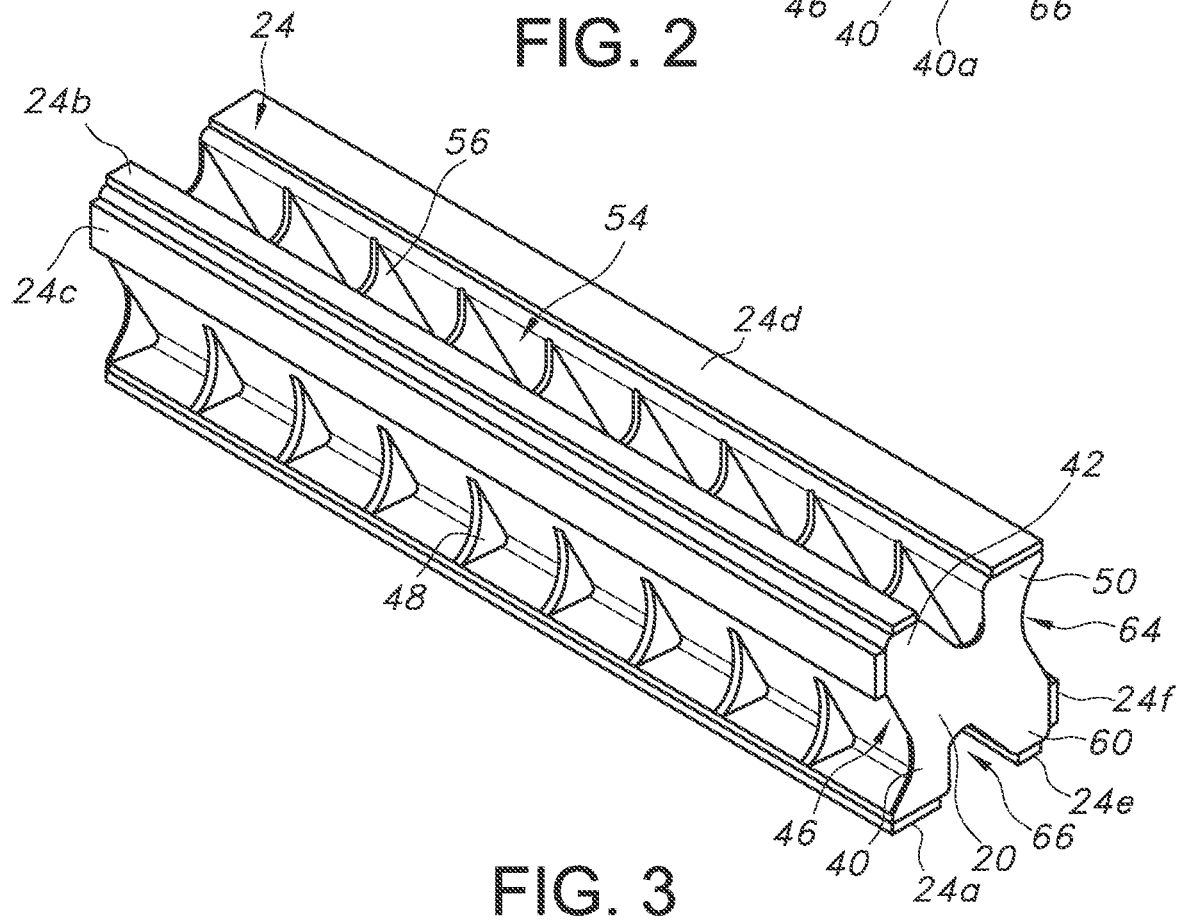
FIG. 3 is a perspective view similar to FIG. 2 but showing structural foam overmolded onto the reinforcement member.

More specifically, and with additional reference to FIGS. 2 and 3, the reinforcement member 20 is elongated in the embodiment shown in FIG. 1A-FIG. 5B and is disposed along a substantial portion of a longitudinal extent of the elongated hollow frame member 14, though this is not required. The vehicle frame construction 10 additionally includes structural foam 24 that is overmolded onto the reinforcement member 20. As shown in FIG. 3, the structural foam 24 can be provided as strips (e.g., strips 24a, 24b, 24c, 24d, 24e and 24f) disposed along contact areas (e.g., contact areas 40a, 42a, 42b, 50a, 60a and 60b) of the reinforcement member 20 as will be described in more detail below. In one embodiment, the structural foam 24 is a heat activated epoxy foam that is initially overmolded onto the reinforcement member 20 and later heat activated to expand and bond the reinforcement member 20 to the elongated hollow frame member 14.

Figure 4:
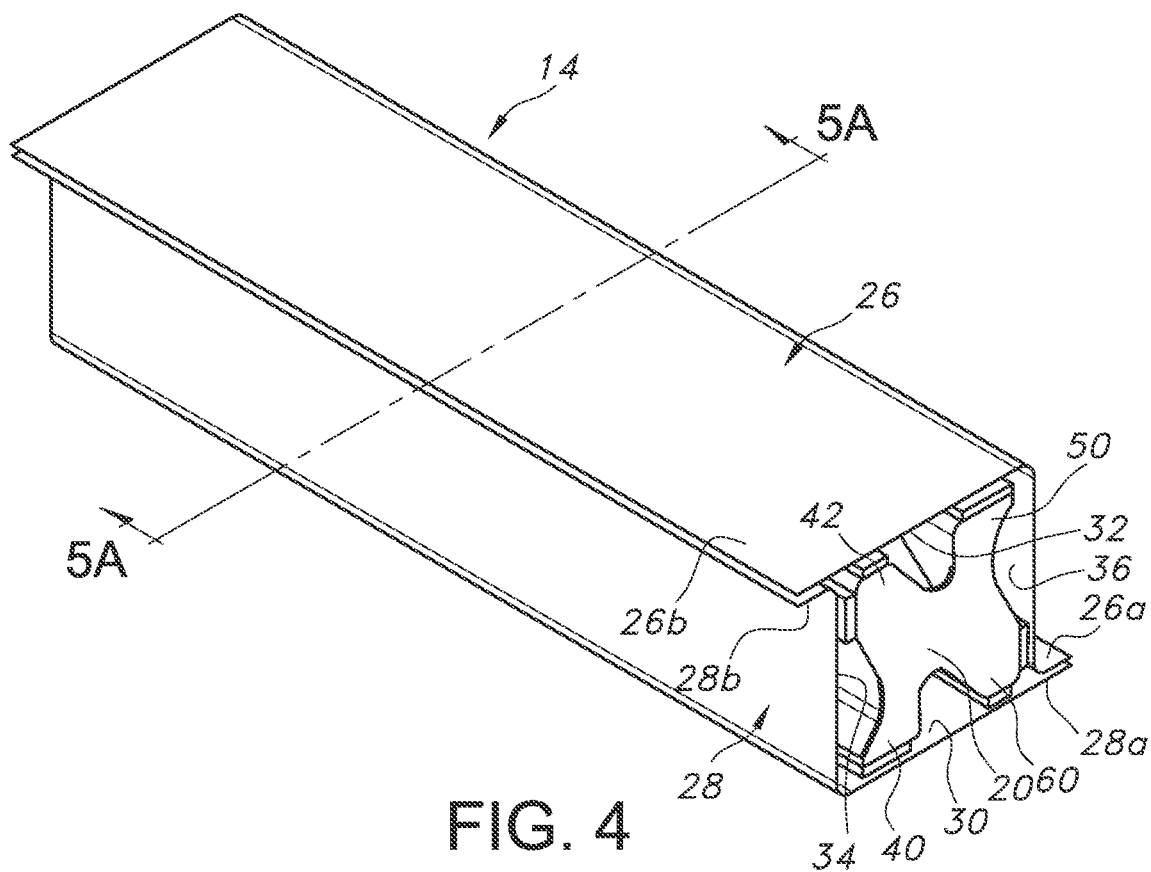
FIG. 4 is a perspective view similar to FIG. 3 but showing the reinforcement member with the overmolded structural foam arranged inside the pillar member.
Figure 5A:
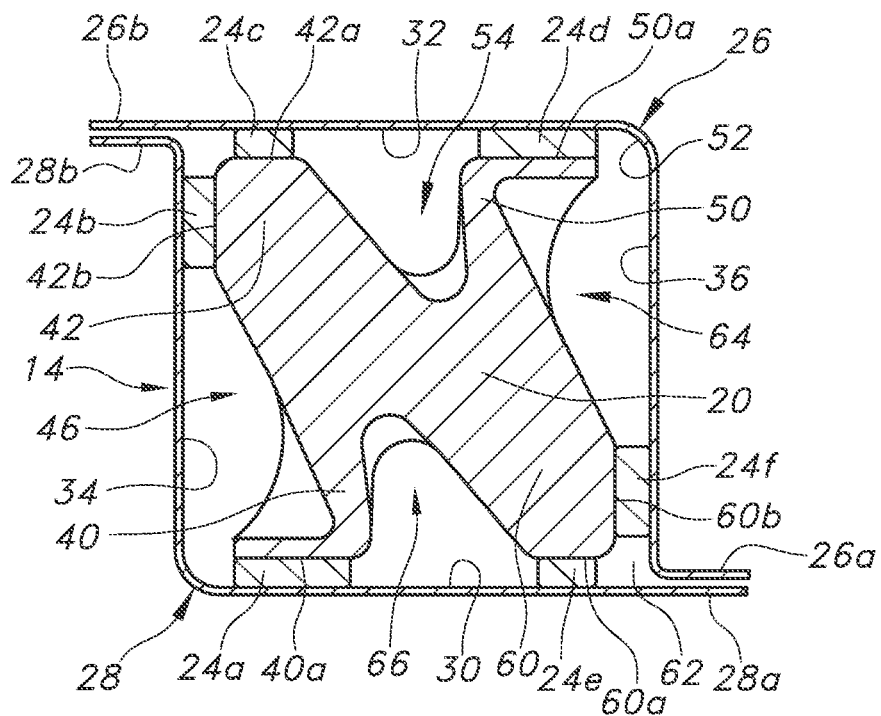
FIG. 5A is a cross-section view taken along the line 5A-5A of FIG. 4.
Figure 5B:
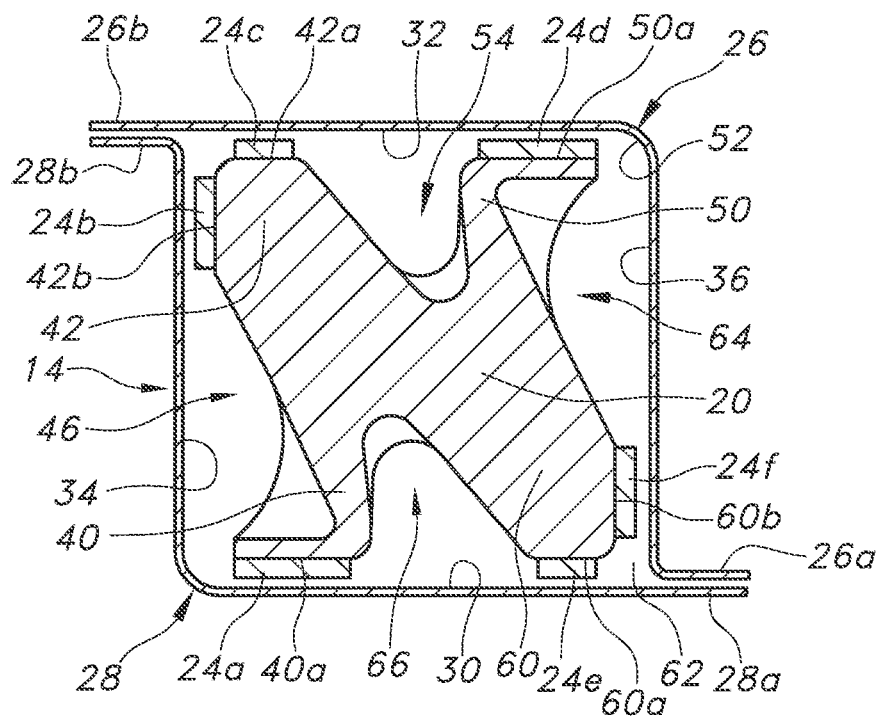
FIG. 5B is a cross-section view similar to FIG. 5A but shown prior to heat activation of the structural foam.

With additional reference to FIGS. 4, 5A and 5B, wherein the elongated hollow frame member 20, the reinforcement member 20 and the structural foam 24 are shown from an end opposite that shown in FIG. 1B, the structural foam 24 can be interposed between the reinforcement member 20 and each interior side of the plurality of interior sides of the elongated hollow frame member 14. More specifically, in the illustrated embodiment, the elongated hollow frame member 14 is constructed so as to have four interior sides, though other configurations can be used. More particularly, as shown for the illustrated embodiment, the elongated hollow frame member 14 includes an outer member 26 having mating flanges 26a, 26b and an inner member 28 having mating flanges 28a, 28b. The mating flanges 26a, 28a and 26b, 28b can be, respectively, laid against one another and welded or otherwise secured together as is known and understood by those skilled in the art to form the elongated hollow frame member 14. By this construction, the plurality of interior sides of the elongated hollow frame member 14 includes at least four sides arranged in two sets including a first set of spaced apart sides 30, 32 and a second set of spaced apart sides 34, 36 arranged approximately perpendicularly relative to the first set of spaced apart sides 30, 32. In the illustrated embodiment, the sides 30, 34 are provided by the inner member 28 and the sides 32, 36 are provided by the outer member 26. As shown, the structural foam 24, and particularly the strips 24a-24f, are interposed between the reinforcement member 20 and each interior side 30, 32, 34, 36 of the elongated hollow frame member 14.

The reinforcement member 20 of the illustrated embodiment includes a first leg 40 extending toward the first set first interior side 30. The first leg 40 has a first set first interior side contact portion 40a arranged to extend along at least a portion of the first set first interior side 30. Strip 24a of the structural foam 24 is overmolded onto the first set first interior side contact portion 40a. The reinforcement member 20 additionally includes a second leg 42 extending toward an intersection 44 between the first set second interior side 32 and the second set first interior side 34. The second leg 42 has a first set second interior side contact portion 42a arranged to extend along at least a portion of the first set second interior side 32 and a second set first interior side contact portion 42b arranged to extend along at least a portion of the second set first interior side 34. A first recess 46 is disposed between the first leg 40 and the second leg 42 and extends a long a portion of the second set first interior side 34. Strips 24b, 24c are, respectively, overmolded onto the contact portions 44a, 44b. As best shown in FIGS. 2 and 3, a plurality of spaced apart reinforcement ribs 48 can be provided along the elongated length of the reinforcement member 20 within the recess 46, though these are not required.

The reinforcement member 20 further includes a third leg 50 extending toward an intersection 52 between the first set second interior side 32 and the second set second interior side 36. The third leg 50 has a first set second interior side contact portion 50a arranged to extend along at least a portion of the first set second interior side 32. Strip 24d of the structural foam 24 is overmolded onto the contact portion 50a. A second recess 54 is disposed between the second leg 42 and the third leg 50 and extends along a portion of the first set second interior side 32. A plurality of spaced apart reinforcement ribs 56 can be provided along the elongated length of the reinforcement member 20 within the recess 54, though these are not required.

The reinforcement member 20 can also include a fourth leg 60 extending toward an intersection 62 between the first set first interior side 30 and the second set second interior side 36. The fourth leg 60 has a first set first interior side contact portion 60a arranged to extend along at least a portion of the first set first interior side 30 and a second set second interior side contact portion 60b arranged to extend along at least a portion of the second set second interior side 36. Strips 24e, 24f of the structural foam 24 are overmolded, respectively, on the contact portions 60a, 60b so as to be interposed between the reinforcement member 20 and the sides 30, 36. A third recess 64 is disposed between the third leg 50 and the fourth leg 60 and extends along a portion of the second set interior side surface 36. A fourth recess 66 is disposed between the fourth leg 60 and the first leg 40 and extends along a portion of the first set first interior side 30. Though not shown, a plurality of reinforcement ribs like the ribs 48 and/or 56 can be provided along the elongated length of the reinforcement member 20 in one or both of the recesses 64 and 66.

As best shown in FIGS. 5A and 5B, the reinforcement member 20 of the illustrated embodiment has a generally N-shaped profile in a plane orthogonally oriented relative to the longitudinal axis 22 of the elongated hollow frame member 14 with the four legs 40, 42, 50 and 60 extending toward the four interior sides of the frame member 14. It is to be appreciated, however, that other profiles could be used and other numbers of legs (e.g., less than four or more than four) could be provided for the reinforcement member 20. Moreover, while the frame member 14 is shown only schematically as having a relatively simple rectangular interior cross-section, it should be appreciated by those skilled in the art that the frame member 14 deployed on an actual vehicle can have a more complex cross-section that is not necessarily uniform along its longitudinal length, nor necessarily rectangular as shown in the illustrated embodiment. Further, the number of interior sides presented by the frame member and/or the number of interior sides reinforced by the reinforcement member via the intermediately disposed structural foam 24 can vary.

Advantageously, the vehicle frame construction described hereinabove enables reinforcement to all interior sides 30, 32, 34, 36 of the frame member 14 and provides contact surfaces 40a, 42a, 42b, 50a, 60a and 60b to enable the structural foam 24 to be overmolded sufficiently thereon and interposed between the reinforcement member 20 and the frame member 14 for bonding therebetween while simultaneously providing significant recessed portions, including recesses 46, 54, 64 and 66, to reduce the overall weight of the reinforcement member 20. In one embodiment, the reinforcement member 20 is one of nylon or fiber-reinforced nylon which provides preferred structural characteristics while maintaining a reasonable weight for a reinforcement member (i.e., not unnecessarily increasing the weight of the vehicle frame 12). Accordingly, the nylon-based reinforcement member 20 can be arranged within the frame member 14 to reinforce each interior side of the frame member 14 in a plane orthogonally oriented relative to the longitudinal axis 22 of the frame member 14.

Figure 6:
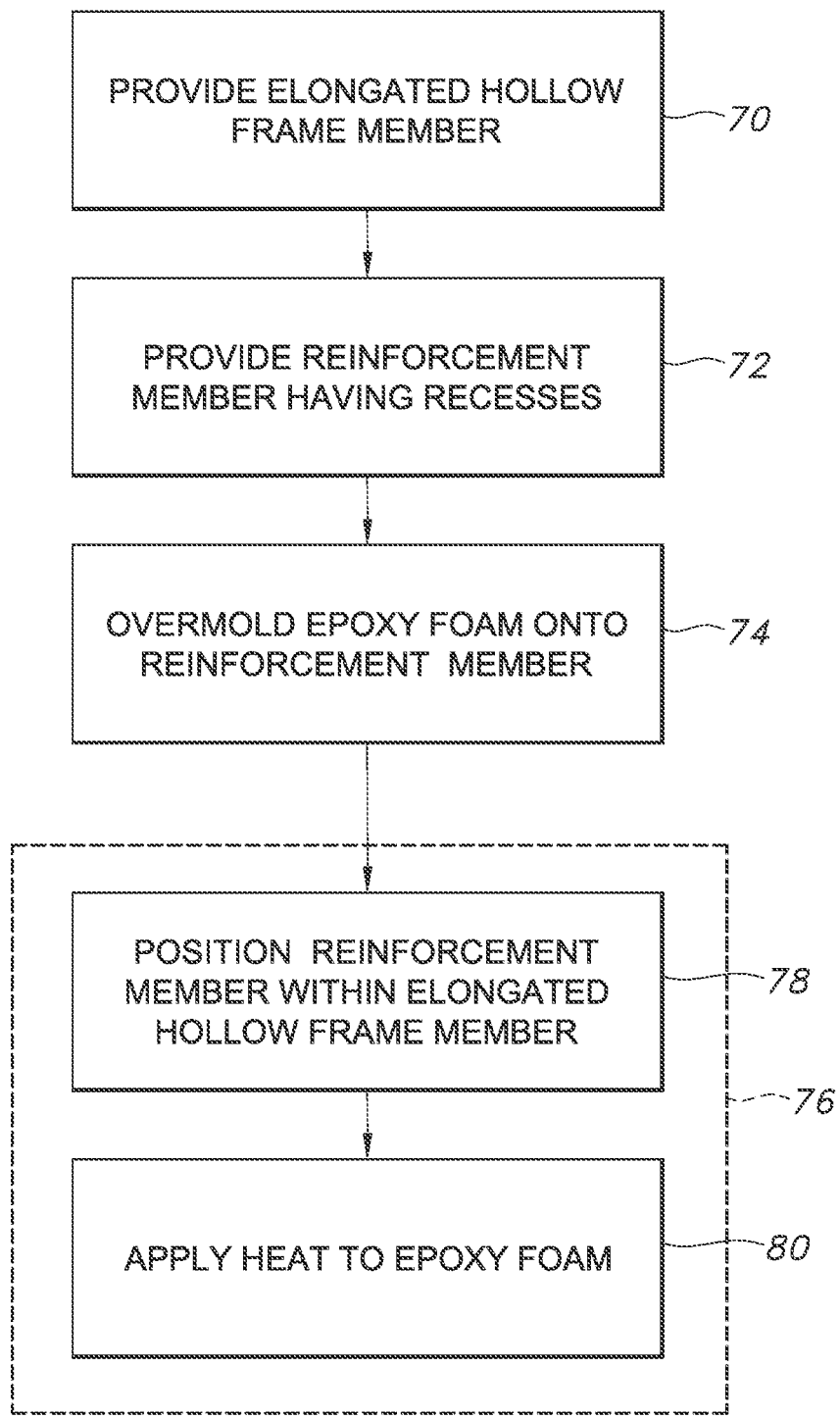
FIG. 6 is a schematic process flow diagram illustrating a vehicle frame construction method according to an exemplary embodiment.

With reference to FIG. 6, a vehicle frame construction method will now be described. In particular, the method of FIG. 6 can be used with the vehicle frame construction 10 described hereinabove and will be described with reference thereto, though this is not required and other vehicle frame constructions can be used. In the method of FIG. 6, at 70, an elongated hollow frame member having a plurality of interior sides is provided, which can be the elongated hollow frame member 14. Next, at 72, a reinforcement member formed from a thermoplastic polymer is provided, wherein the reinforcement member has a plurality of longitudinally extending recesses. For example, the reinforcement member 20 can be provided. As described above, the reinforcement member 20 can be formed from a thermoplastic polymer (e.g., nylon or fiber-reinforced nylon) and the reinforcement member 20 has the plurality of longitudinally extending recesses in the form of recesses 46, 56, 64 and 66. Next, in 74, an epoxy foam can be overmolded onto contact portions of the reinforcement member 20. For example, the structural foam 24 in the form of strips 24a-24f can be overmolded onto the contact portions 40a, 42a, 42b, 50a, 60a and 60b of the reinforcement member 20. Optionally, step 74 concerning overmolding can have already occurred in step 72 (i.e., the provision of the reinforcement member 20 in step 72 can include providing the reinforcement member 20 with the structural foam 24 already overmolded thereon).

Next, as shown at 76, the reinforcement member can be installed within the elongated hollow frame member to reinforce each interior side of the hollow frame member in a plane orthogonally oriented relative to a longitudinal axis of the elongated hollow frame member. Once fully installed, each of the recesses of the reinforcement member spaces portions of the reinforcement member apart from the interior sides of the elongated hollow frame member. Such installing of the reinforcement member within the elongated hollow frame member at 76 can include positioning the reinforcement member within the elongated hollow frame member as shown at 78 and subsequently applying heat to the epoxy foam to expand the epoxy foam and bond the contact portions of the reinforcement member to the elongated hollow frame member as shown at 80.

Applied to the vehicle frame construction 10, positioning the reinforcement member 20 within the elongated hollow frame member 14 can involve positioning the reinforcement member 20 with the structural foam 24 already overmolded thereon on one of the parts that comprise the frame member 14 and then the other of the parts that comprise the frame member 14 can be combined to enclose the reinforcement member 20. For example, the inner member 28 can receive the reinforcement member 20 thereon and then the outer member 26 can be overlaid onto the inner member 28 while enclosing the reinforcement member 20. At this stage, and with reference to FIG. 5B, the structural foam 24 has not yet had heat applied for heat activation thereof and thus does not fully function to reinforce the interior sides 30, 32, 34, 36 of the frame member 14, nor are the legs 40, 42, 50, 60 of the reinforcement member 20 bonded to the frame member 14. In step 80, however, when heat is applied to the epoxy foam (e.g., as the vehicle frame 12 passes through various heating apparatus, e.g., ovens, to address surface finishing of the vehicle body, the structural foam 24 expands and bonds the contact portions of the reinforcement member 20 to the frame member 14 as shown in FIG. 5A. At this stage, the reinforcement member 20 is fully installed within the elongated hollow frame member 14 and each interior side 30, 32, 34 and 36 of the elongated hollow frame member 14 is reinforced by the reinforcement member 20 in the plane orthogonally oriented relative to the longitudinal axis 22 of the elongated hollow frame member 14. Notably, the recesses 46, 54, 64 and 66 space significant portions of the reinforcement member 20 apart from the interior sides 30, 32, 34 and 36 of the elongated hollow frame member 14.

Figure 7:
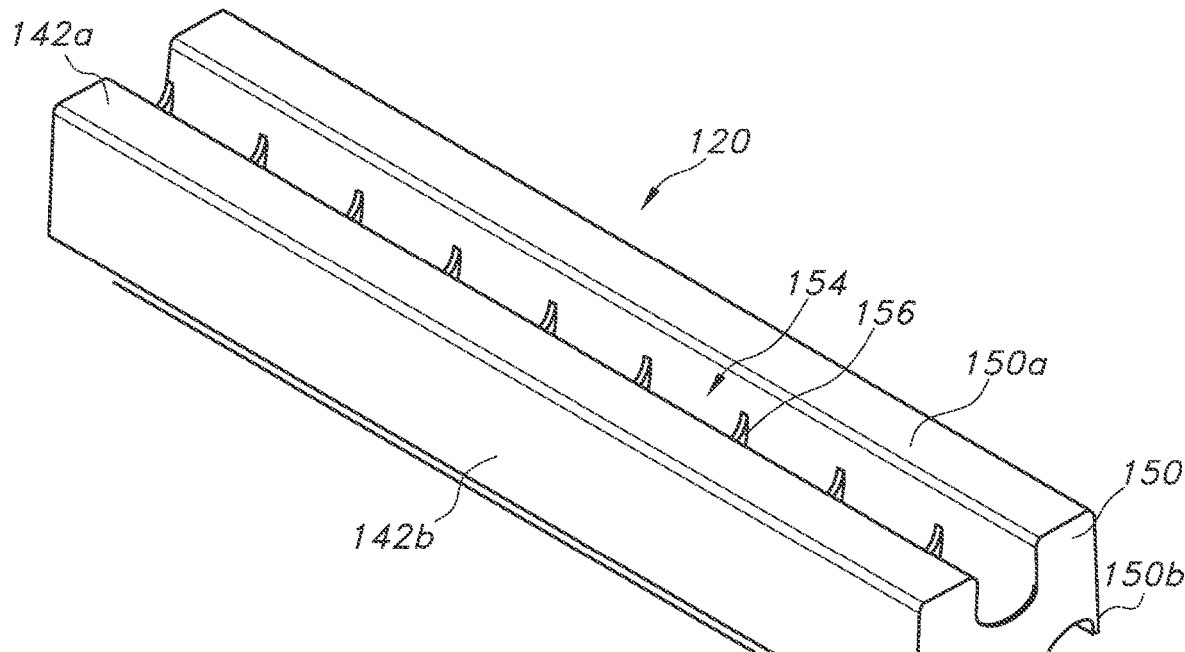
FIG. 7 is a perspective view of a reinforcement member according to an alternate exemplary embodiment.
Figure 8:
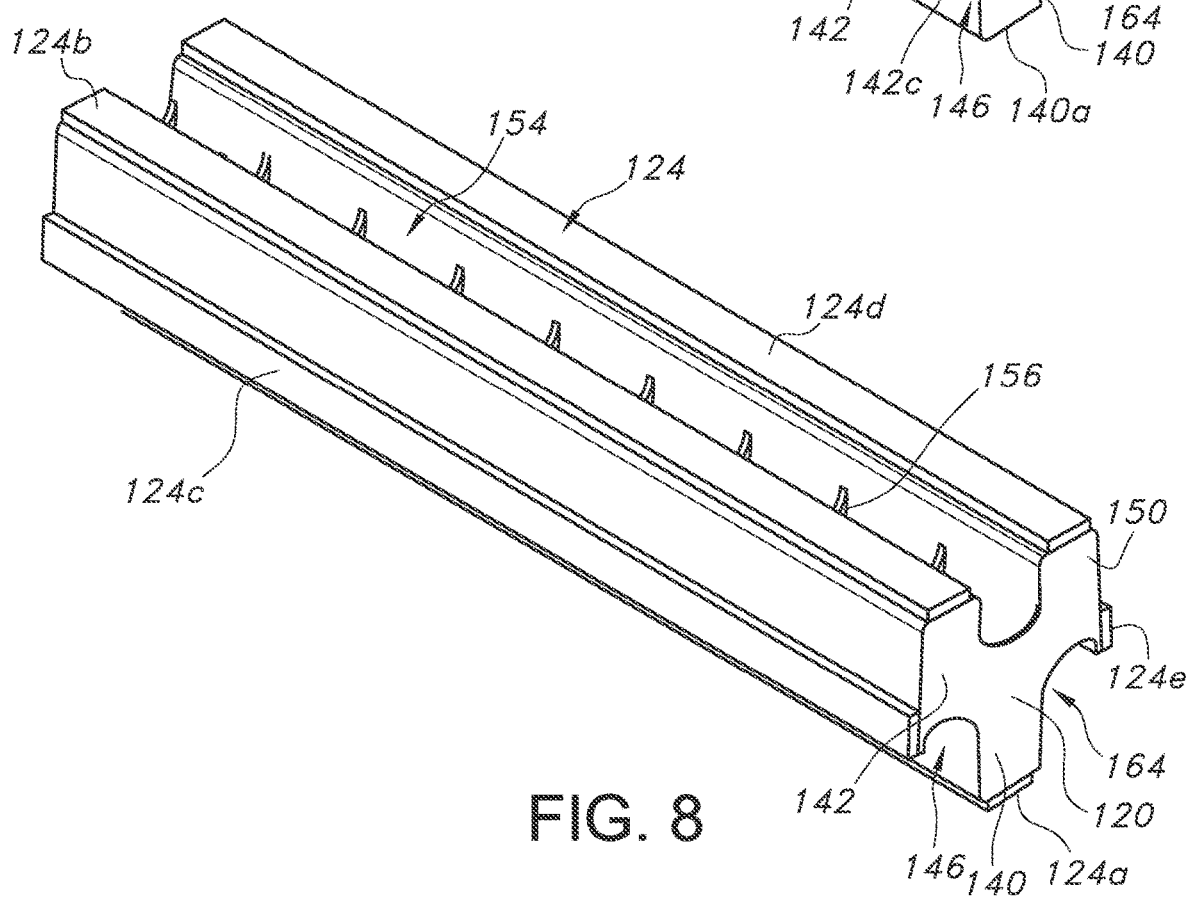
FIG. 8 is a view similar to FIG. 7 but showing a structural foam overmolded onto the reinforcement member of FIG. 7.
Figure 9:
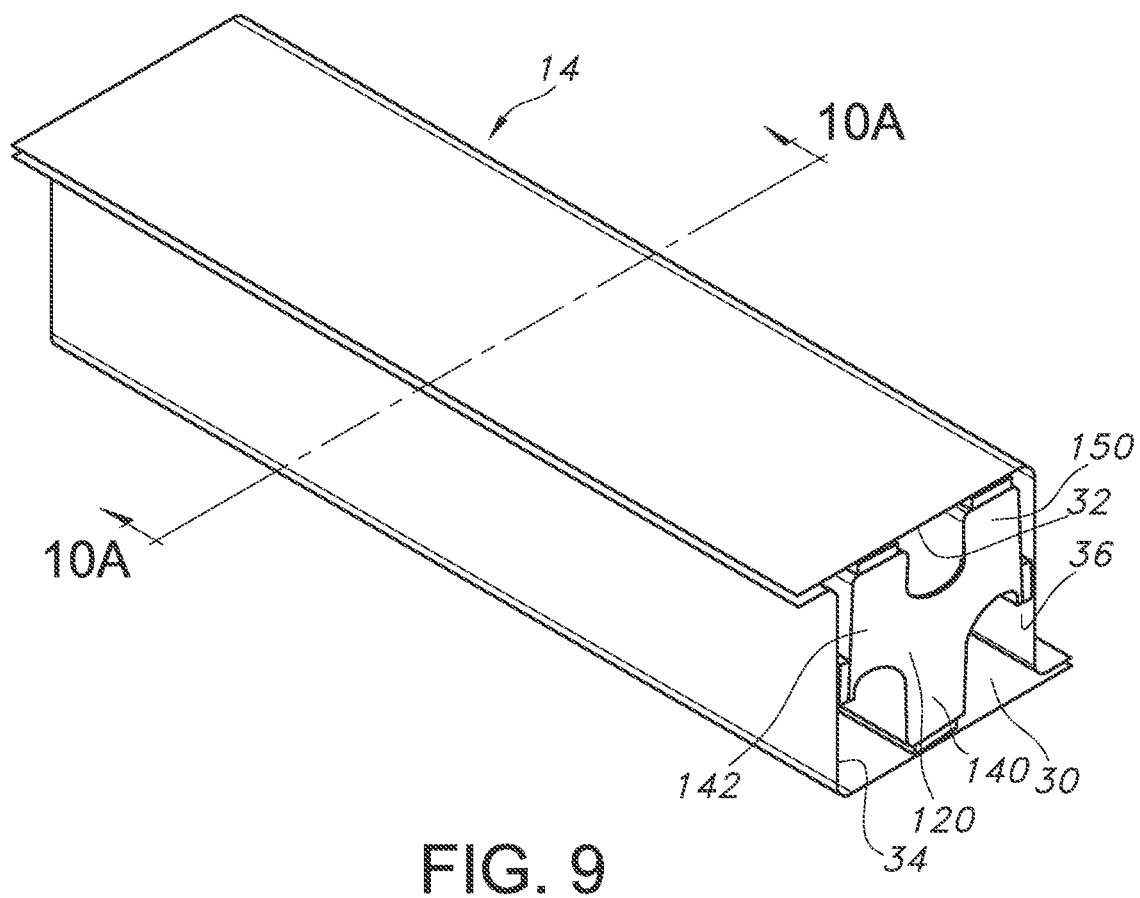
FIG. 9 is a perspective view similar to FIG. 8 but showing the reinforcement member with the overmolded structural foam arranged inside a pillar member.
Figure 10A:
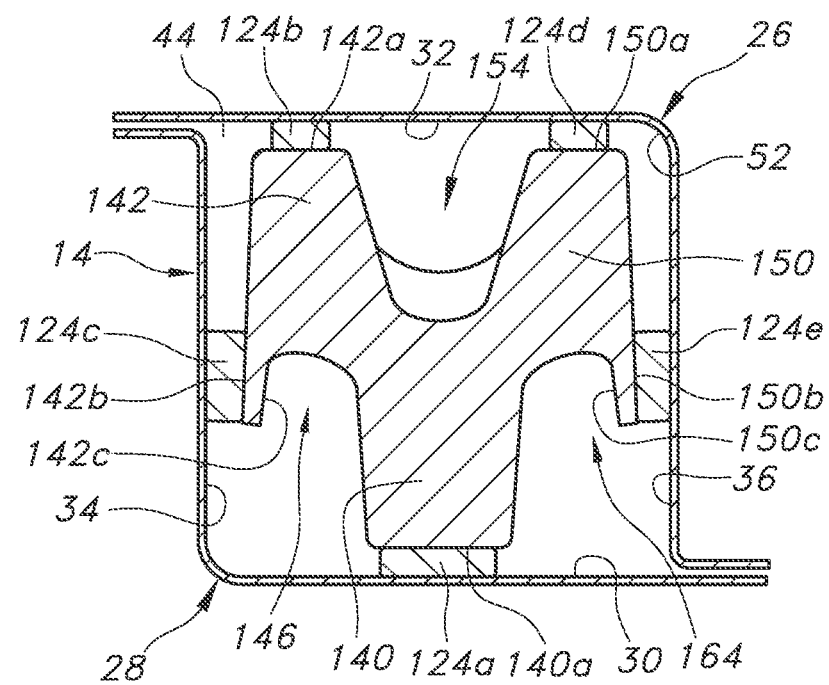
FIG. 10A is a cross-section view taken along the line 10A-10A of FIG. 9.
Figure 10B:
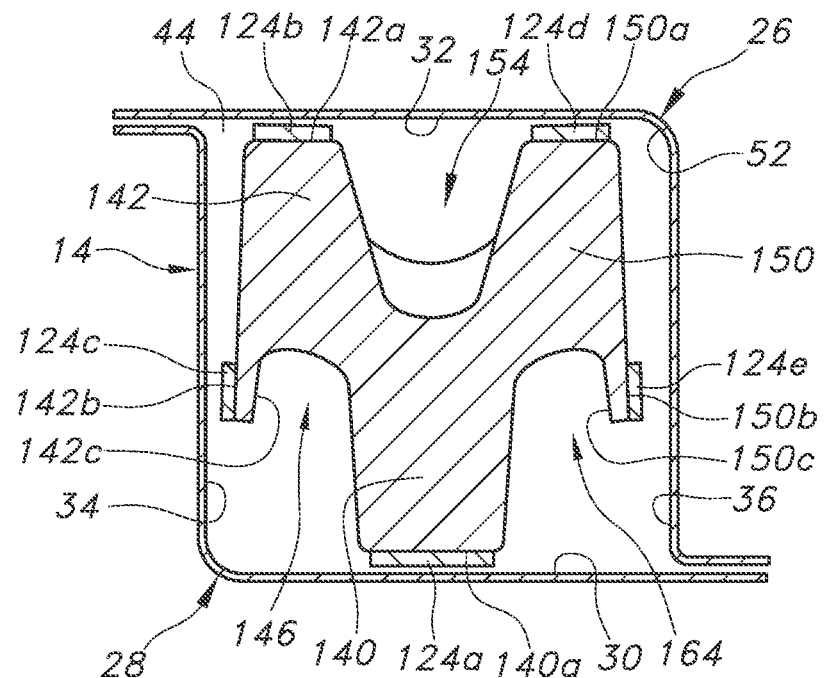
FIG. 10B is a cross-section view similar to FIG. 10A but shown prior to heat activation of the structural foam.
Figure 13A:
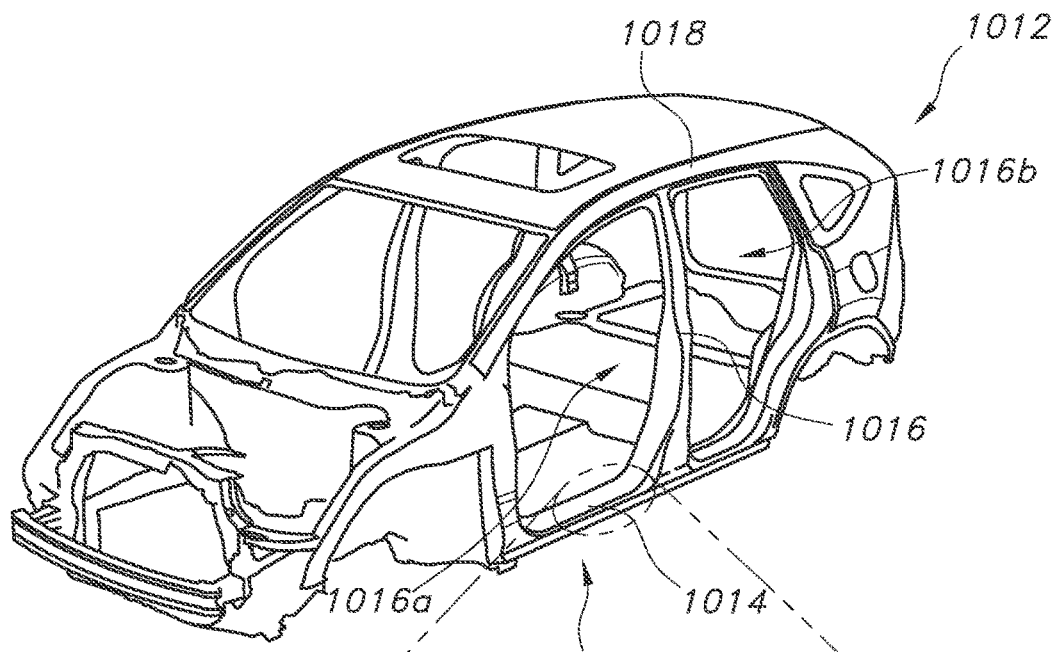
FIG. 13A is a perspective view of a vehicle frame similar to FIG. 1A.
Figure 13B:
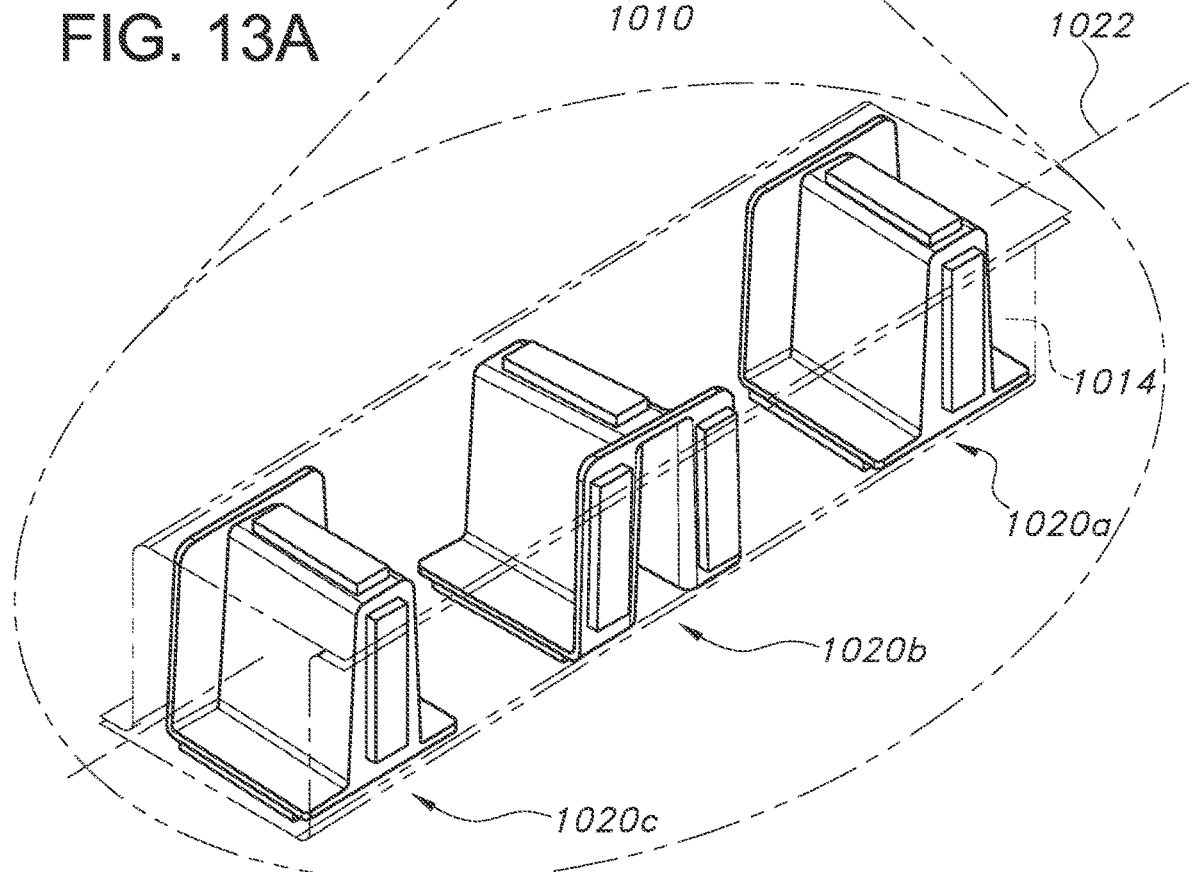
FIG. 13B is a schematic perspective view showing a portion of the side sill member of the vehicle frame of FIG. 13A with a plurality of reinforcement members arranged in spaced apart relation to one another according to a further exemplary embodiment.

With reference to FIGS. 7 and 8, a reinforcement member 120 is shown according to an alternate exemplary embodiment. The reinforcement member 120 can be like the reinforcement member 20 of FIG. 2 except as indicated below. For example, the reinforcement member 120 is elongated in the embodiment shown in FIGS. 7-10B and can be disposed along a substantial portion of a longitudinal extent of an elongated hollow frame member, such as frame member 14, though this is not required. Also like the reinforcement member 20, the reinforcement member 120 can be used in a vehicle frame construction that additionally includes structural foam 124 that is overmolded onto the reinforcement member 120. As shown in FIG. 8, the structural foam 124 can be provided as strips (e.g., strips 124a, 124b, 124c, 124d, 124e) disposed along contact areas (e.g., contact areas 140a, 142a, 142b, 150a, 150b) of the reinforcement member 120 as will be described in more detail below. The structural foam 24 can be the same as the structural foam 24 (e.g., a heat activated epoxy foam that is initially overmolded onto the reinforcement member 120 and later heat activated to expand and bond the reinforcement member 120 to a frame member in which the reinforcement member 120 is installed). As shown in FIGS. 9, 10A and 10B, the reinforcement member 120 with the structural foam 124 molded thereon can be installed into an elongated hollow frame member, which can be the same elongated hollow frame member 14 described in the earlier embodiment. Accordingly, the structural foam 124 can be interposed between the reinforcement member 120 and each interior side of the plurality of interior sides 30, 32, 34, 36 of the elongated hollow frame member 14.

In the embodiment illustrated, the reinforcement member 120 includes a first leg 140 extending toward the first set first interior side 30 of the frame member 14. The first leg 140 has a first set first interior side contact portion 140a arranged to extend along at least a portion of the first set first interior side 30. Strip 124a of the structural foam 124 is overmolded onto the first set first interior side contact portion 140a. The reinforcement member 120 additionally includes a second leg 142 extending toward an intersection 44 between the first set second interior side 32 and the second set first interior side 34. The second leg 142 has a first set second interior side contact portion 142a arranged to extend along at least a portion of the first set second interior side 32 and a second set first interior side contact portion 142b arranged to extend along at least a portion of the second set first interior side 34. Particular to the embodiment illustrated in FIGS. 7-10A, the contact portion 142b is provided on a depending portion 142c that extends downwardly in FIGS. 10A and 10B along the side 34 toward the side 30. A first recess 146 is disposed between the first leg 140 and the second leg 142. Strips 124b, 124c are, respectively, overmolded onto the contact portions 144a, 144b. Optionally, though not included in the illustrated embodiment, a plurality of spaced part reinforcement ribs (e.g., similar to ribs 48) can be provided along the elongated length of the reinforcement member 120 within the recess 146.

The reinforcement member 120 can further include a third leg 150 extending toward the intersection 52 between the first set second interior side 32 and the second set second interior side 36. The third leg 150 has a first set second interior side contact portion 150*a* arranged to extend along at least a portion of the first set second interior side 32. The third leg 150 also has a second set second interior side contact portion 150*b* arranged to extend along at least a portion of the second set second interior side 36. A second recess 154 is disposed between the second leg 142 and the third leg 150 and extends along a portion of the first set second interior side 32. As shown, a plurality of spaced apart reinforcement ribs 156 can be provided along the elongated length of the reinforcement member 120 within the recess 154, though these are not required. Strips 124*d*, 124*e* are, respectively, overmolded onto the contact portions 150*a*, 150*b*. The contact portion 150*b* can be provided on a depending portion 150*c* of the third leg 150 that extend downwardly in FIGS. 10A and 10B along the side 36 toward the side 30. A third recess 164 is disposed between the third leg 150 and the first leg 140 and extends along a portion of the second set interior side surface 36 and the first set interior side surface 30. Though not included in the illustrated embodiment, a plurality of reinforcement ribs (e.g., similar to ribs 48) could be provided along the elongated length of the reinforcement member 120 in the recess 164.

As best shown in FIGS. 10A and 10B, the reinforcement member 120 of the embodiment illustrated has a generally Y-shaped profile in a plane orthogonally oriented relative to a longitudinal axis 22 of the elongated hollow frame member 14 with the three legs 140, 142 and 150 extending toward the four interior sides of the frame member 14. As with the reinforcement member 20, it is to be appreciated with the reinforcement member 120 that other profiles could be used and other numbers of legs (e.g., less than three or more than three) could be provided for the reinforcement member 120. Advantageously, and like the reinforcement member 20, a vehicle frame construction including the reinforcement member 120 and the structural foam 124 enables reinforcement to all interior sides 30, 32, 34, 36 of the frame member 14 and provides contact surfaces 140*a*, 142*a*, 142*b*, 150*a* and 150*b* to enable the structural foam 124 to be overmolded sufficiently thereon and interposed between the structural member 120 and the frame member 14 for bonding therebetween while simultaneously providing significant recessed portions, including recesses 146, 154 and 164, to reduce the overall weight of the reinforcement member 120. Also like the reinforcement member 20, the reinforcement member 120 can be a nylon or fiber-reinforced nylon which provides preferred structural characteristics while maintaining a reasonable weight for a reinforcement member. Optionally, the reinforcement member 120 can be used as the reinforcement member in the method of FIG. 6.

With reference to FIGS. 11A and 11B, another alternate embodiment is shown wherein the elongated reinforcement member 20 is replaced by a plurality of like reinforcement members 220*a*, 220*b* and 220*c* disposed at spaced apart locations along a longitudinal extent of an elongated frame member. In the embodiment shown, the frame member is the side seal member 16. In most if not all other respects, each of the reinforcement members 220*a*, 220*b* and 220*c* can be like the reinforcement member 20 though the width is reduced (i.e., is not elongated) and the reinforcement members 220*a*, 220*b*, 220*c* are used in a spaced apart arrangement as shown. By way of non-limiting example, the reinforcement member 20 could extend along a significant length of the pillar member 14 (e.g., one meter). Similarly, the spaced part reinforcement members 220*a*, 220*b*, 220*c* could be provided along the side seal member 16, though each reinforcement member 220*a*, 220*b*, 220*c* can be relatively reduced in its dimension that extends along the side seal member 16 (e.g., each could have a length of 6-10 centimeters).

While the embodiment shown has three reinforcement members, it is to be appreciated that any number of reinforcement members could be used. Also, it is to be appreciated that varying lengths of reinforcement members 20 or 220*a*, 220*b* and 220*c* could be used on the vehicle frame 12. Generally, however, it has been found that using a plurality of spaced apart reinforcement members 220*a*, 220*b*, 220*c* may provide advantages in horizontally disposed members (e.g., side seal members, roof rail members, cross beams, tailgate cross beams, etc.), whereas elongated reinforcement members, such as the reinforcement member 20, may be better suited for use in vertically disposed hollow frame members, such as pillar members. This, of course, is not required and either type of reinforcement, elongated or non-elongated, could be used in either type of vertically or horizontally disposed frame members.

With reference to FIG. 12, another alternate embodiment is shown. In this embodiment, reinforcement members 320*a*, 320*b* and 320*c* are shown as a plurality of like reinforcement members disposed at spaced apart locations along a longitudinal extent of the side seal member 16. The reinforcement members 320*a*, 320*b*, 320*c* can be the same or similar to the reinforcement member 120, though the widths are reduced. Like the reinforcement members described hereinabove, any number or length of such spaced apart reinforcement members could be used and the embodiment illustrated in FIG. 11 is for illustrative purposes only.

With reference now to FIGS. 13A through 18B, still another alternate embodiment is shown wherein a vehicle frame construction 1010 includes a vehicle frame 1012 comprised of a plurality of elongated hollow frame members. One of the elongated hollow frame members is a side sill member 1014 extending along a lateral side of the vehicle frame 1012 in a direction parallel to a forward direction of travel for the vehicle frame 1012. In the illustrated vehicle frame 1012, a vertical pillar member 1016 extends upward from a center portion of the side sill member 1014 to a roof rail member 1018. The members 1014, 1016, 1018 at least partially define door openings 1016*a*, 1016*b* on the vehicle frame 1012. With specific reference to FIG. 13B, the vehicle frame construction 1010 additionally includes a plurality of reinforcement members 1020*a*, 1020*b* and 1020*c* arranged in a spaced apart pattern within the elongated hollow frame member 1014. While shown in the illustrated embodiment as a side sill member, the hollow frame member 1014 can alternatively be used as a pillar member, a roof rail, front or rear frame side members, an underside frame member (e.g., a cross member), etc.

In particular, and as will be described in more detail below, the elongated hollow frame member 1014 has a plurality of interior sides (e.g., sides 1030, 1032, 1034, 1036 shown in FIGS. 18A and 18B). The reinforcement members 1020*a*, 1020*b*, 1020*c* are arranged within the elongated hollow frame member 1014 to reinforce each interior side of the elongated hollow frame member 1014 in a plane orthogonally oriented relative to a longitudinal axis 1022 of the elongated hollow frame member 1014. Each of the reinforcement members 1020*a*, 1020*b* and 1020*c* can be formed from a thermoplastic polymer and each has contact portions (e.g., contact portions 1040, 1042, 1044 and 1046 shown in FIGS. 14 and 15) arranged adjacent each of the plurality of interior sides of the elongated hollow frame member 1014. The reinforcement members 1020*a*, 1020*b* and 1020*c* can be identical to one another but can be arranged in a rotating pattern within the elongated hollow frame member 1014. For example, as shown, the second reinforcement member 1020b can be rotated 180 degrees within the frame member 1014 relative to the first reinforcement member 1020a. Likewise, the third reinforcement member 1020c can be rotated to the same angular position as the first reinforcement member 1020a. If additional reinforcement members are used, a similar alternating rotating pattern can be used.

Figure 14:
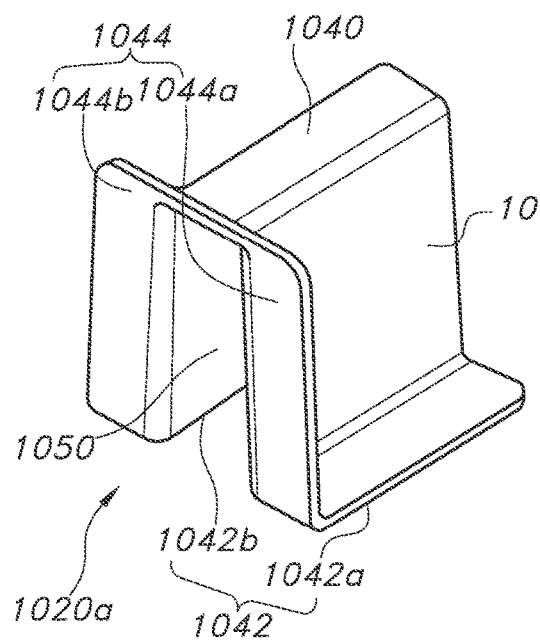
FIG. 14 is a perspective view of one of the reinforcement members taken from a first side of the reinforcement member.
Figure 15:
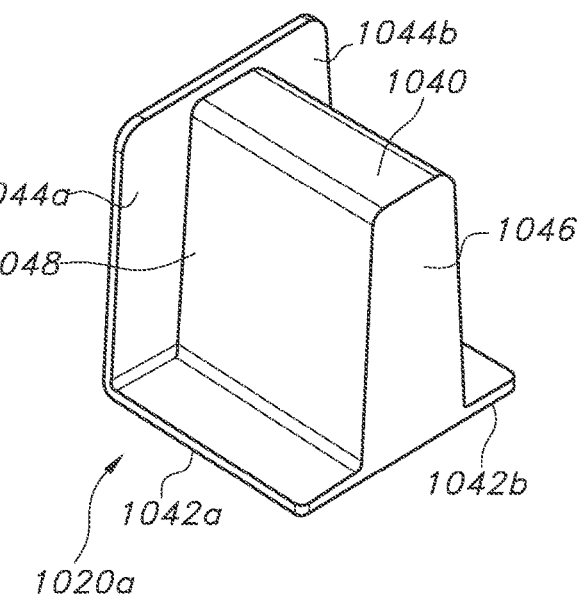
FIG. 15 is a perspective view of the same reinforcement member as depicted in FIG. 14 but taken from another side of the reinforcement member.
Figure 16:
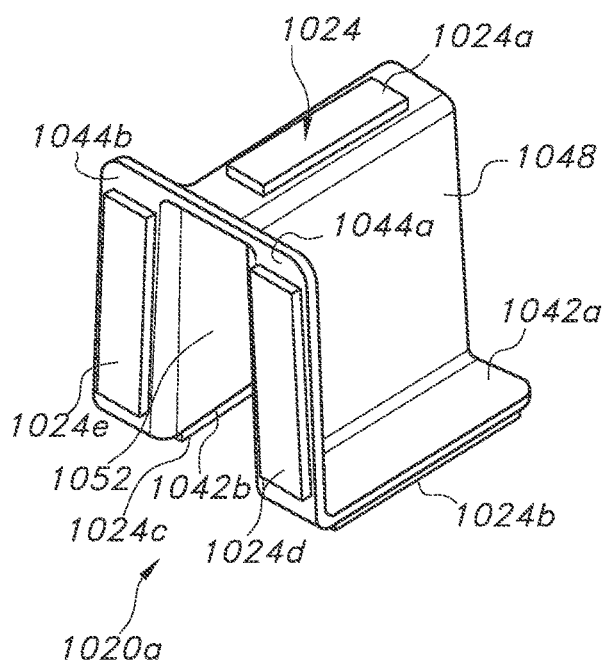
FIG. 16 is a perspective view similar to FIG. 14 but showing structural foam overmolded onto the reinforcement member.
Figure 17:
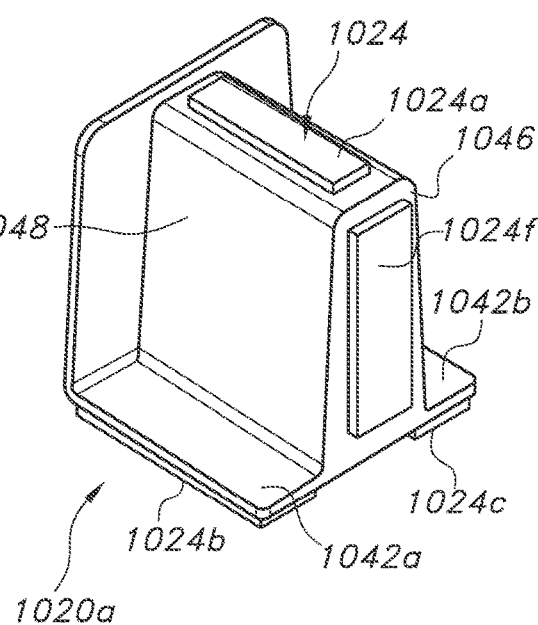
FIG. 17 is a perspective view similar to FIG. 15 but showing structural foam overmolded onto the reinforcement member.

The reinforcement member 1020a is shown in FIGS. 14-17 and further details for the reinforcement members will be discussed in reference to the reinforcement member 1020a. Since the reinforcement members 1020b and 1020c can be identical to the reinforcement member 1020a, it is to be appreciated that the details concerning the reinforcement member 1020a are applicable to the reinforcement members 1020b and 1020c. FIGS. 14 and 15 show the reinforcement member 1020a in isolation from different sides. FIGS. 16 and 17 show a structural foam 1024 overmolded onto the reinforcement member 1020a. As shown, the structural foam 1024 can be provided as strips (e.g., strip 1024a, 1024b, 1024c, 1024d, 1024e strips) disposed along contact areas (e.g., contact areas 1040, 1042, 1044, 1046) of the reinforcement member 1020a. In one embodiment, the structural foam 1024 is a heat activated epoxy foam that is initially overmolded onto the reinforcement member 1020a and later heat activated to expand and bond the reinforcement 1020a to the elongated hollow frame member 1014.

Figure 18A:
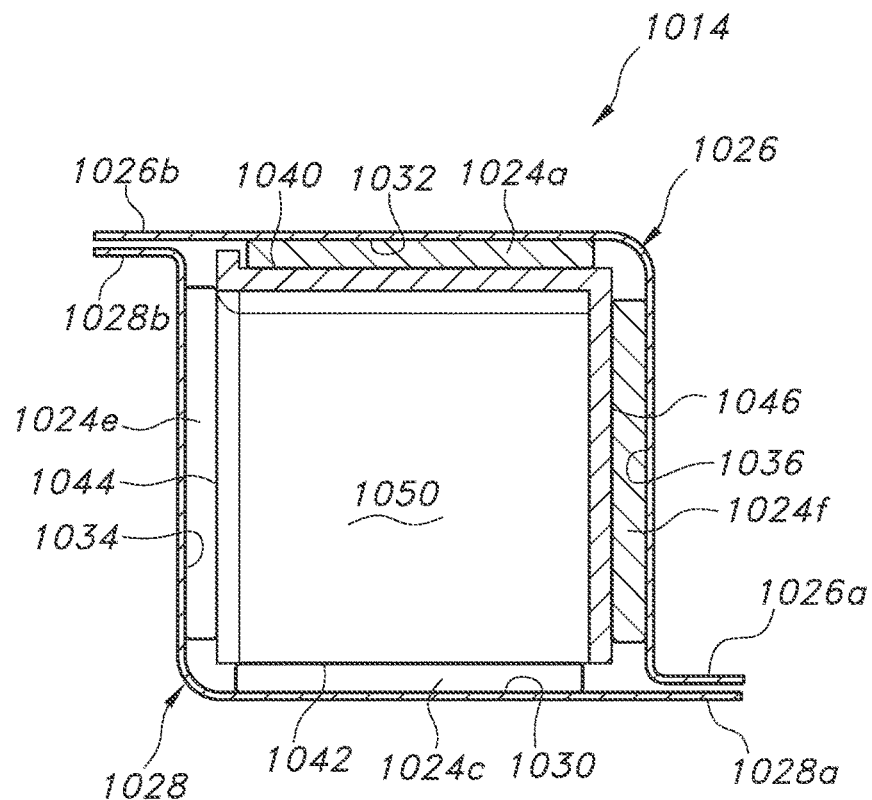
FIG. 18A is a cross-sectional view showing one of the reinforcement members installed within the side sill member.
Figure 18B:
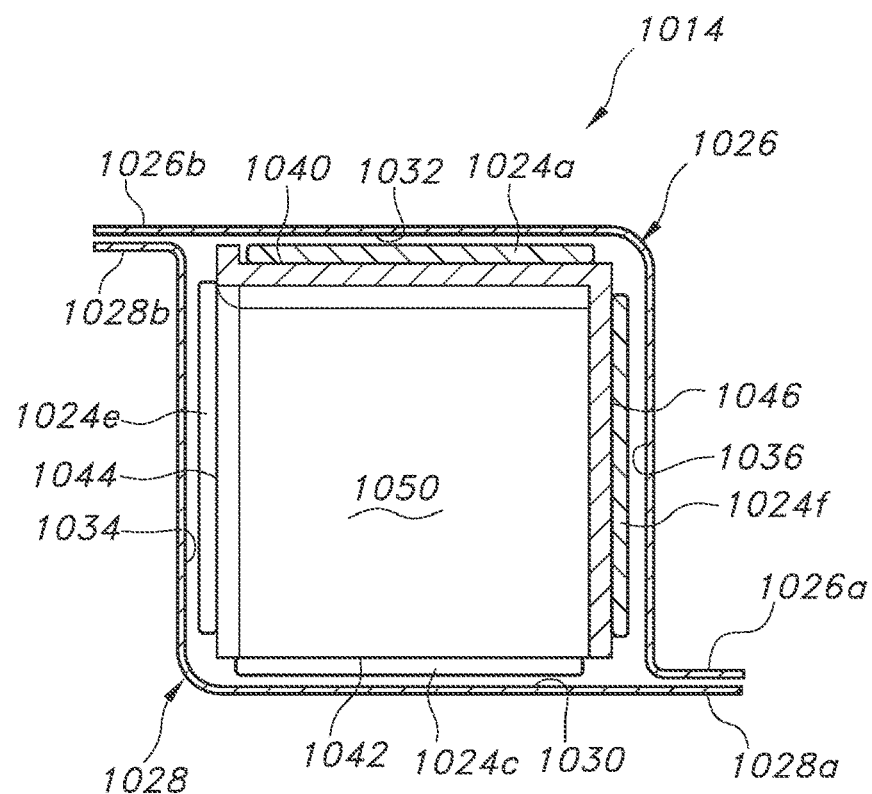
FIG. 18B is a view similar to FIG. 18A but shown prior to heat activation of the structural foam.

With additional reference to FIGS. 18A and 18B, the structural foam 1024 can be interposed between the reinforcement member 1020a and each interior side of the plurality of interior sides of the elongated hollow frame member 1014. More specifically, in the illustrated embodiment, the elongated hollow frame member 1014 is constructed so as to have four interior sides, though other configurations can be used. More particularly, as shown for the illustrated embodiment, the elongated hollow frame member 1014 includes an outer member 1026 having mating flanges 1026a, 1026b and an inner member 1028 having mating flanges 1028a, 1028b. The mating flanges 1026a, 1028a and 1026b, 1028b can be, respectively, laid against one another and welded or otherwise secured together as is known and understood by those skilled in the art to form the elongated hollow frame member 1014.

By this construction, the plurality of interior sides of the elongated hollow frame member 1014 includes at least four sides arranged in two sets including a first set of spaced apart sides 1030, 1032 and a second set of spaced apart sides 1034, 1036 arranged approximately perpendicularly relative to the first set of spaced apart sides 1030, 1032. In the illustrated embodiment, the sides 1030, 1034 are provided by the inner member 1028 and the sides 1032, 1036 are provided by the outer member 1026. As shown, the structural foam 1024, and particularly the strips 1024a 1024b, 1024c, 1024d and 1024e, are interposed between the reinforcement member 1020a and each interior side 1030, 1032, 1034, 1036 of the elongated hollow frame member 1014. In FIGS. 18A and 18B, the side 1032 is shown as an upper side and the side 1030 is shown as the lower side, with the sides 1034, 1036 shown as first and second lateral sides.

The reinforcement member 1020a has contact surfaces or portions arranged adjacent each the plurality of interior sides 1030, 1032, 1034 and 1036. Each of these contact portions extends along substantially an entirety of the adjacent interior side in a plane orthogonally oriented relative to the longitudinal axis 1022. In particular, in the illustrated embodiment, the contact portions of the reinforcement member 1020a include an upper contact portion 1040 complementarily arranged adjacent the upper side 1032 of the plurality of interior sides of the elongated hollow frame member 1014 and a lower contact portion 1042 complementarily arranged adjacent the lower side 1030 of the plurality of interior sides of the elongated hollow frame member 1014 and spaced apart from the upper contact portion 1040. In particular, in the illustrated embodiment, the lower contact portion 1042 is formed of a pair of flanges 1042a, 1042b. A strip 1024a of the structural foam 1024 is overmolded onto the upper contact portion 1040 and strips 1024b and 1024c of the structural foam 1024 are overmolded, respectively, onto the pair of flanges 1042a, 1042b forming the lower contact portion 1042.

The contact portions of the reinforcement member 1020a additionally include a first side contact portion 1044 complementarily arranged adjacent a first side 1034 of the plurality of interior sides of the elongated hollow frame member 1014 and oriented approximately perpendicularly relative to the upper contact portion 1040 and the lower contact portion 1042. In particular, in the illustrated embodiment, the first side contact portion 1044 of the illustrated embodiment is formed of a pair of flanges 1044a, 1044b. Strips 1024c and 1024d of the structural foam 1024 are overmolded, respectively, onto the pair of flanges 1044a, 1044b forming the first side contact portion 1044. Still further, the contact portions of the reinforcement member include a second side contact portion 1046 complementarily arranged adjacent a second side 1036 of the plurality of interior sides of the elongated hollow frame member 1014 and oriented approximately perpendicularly relative to the upper contact portion 1040 and the lower contact portion 1042. Additionally, the second side contact portion 1046 is spaced apart from the first side contact portion 1044. A strip 1024e of the structural foam 1024 is overmolded onto the second side contact portion 1046.

The reinforcement member 1020a further includes at least one support portion extending from the upper contact portion 1040 to the lower contact portion 1042 and extending from the first side contact portion 1044 to the second side contact portion 1046. In the reinforcement member 1020a, the at least one support portion is formed of a pair of support legs 1048, 1050 arranged in spaced apart relation relative to one another. In the illustrated embodiment, the pair of flanges 1042a, 1042b forming the lower contact portion 1042 include first flange 1042a extending from a first one or leg 1048 of the pair of support legs 1048, 1050 and second flange 1042b extending from a second one or leg 1050 of the pair of support legs 1048, 1050. A recess 1052 can be provided between the support legs 1048, 1050 which presents the reinforcement member 1020a as a relatively hollow structure having enhanced weight characteristics (i.e., the hollowed structure has a reduced weight as compared to a solid structure).

As shown, the reinforcement member 1020a has a shape that provides contact portions 1040, 1042, 1044 and 1046 adjacent each of the plurality of interior sides 1030, 1032, 1034, 1036 of the frame member 1014. This enables the structural foam 1024 to be overmolded sufficiently thereon and interposed between the reinforcement member 1020a and the frame member 1014. Such reinforcement to all interior sides of the frame member 1014 occurs without adding significant weight to the vehicle frame 1012. Moreover, the reinforcement member 1020a can be formed of a thermoplastic polymer. In one embodiment, the thermoplastic polymer is one of nylon or fiber-reinforced nylon. In alternate embodiments, not shown, the reinforcement member 1020a can be rotated so that one of the other contact portions 1042, 1044 or 1046 is arranged adjacent the upper side 1030 of the frame member 1014.

Figure 19:
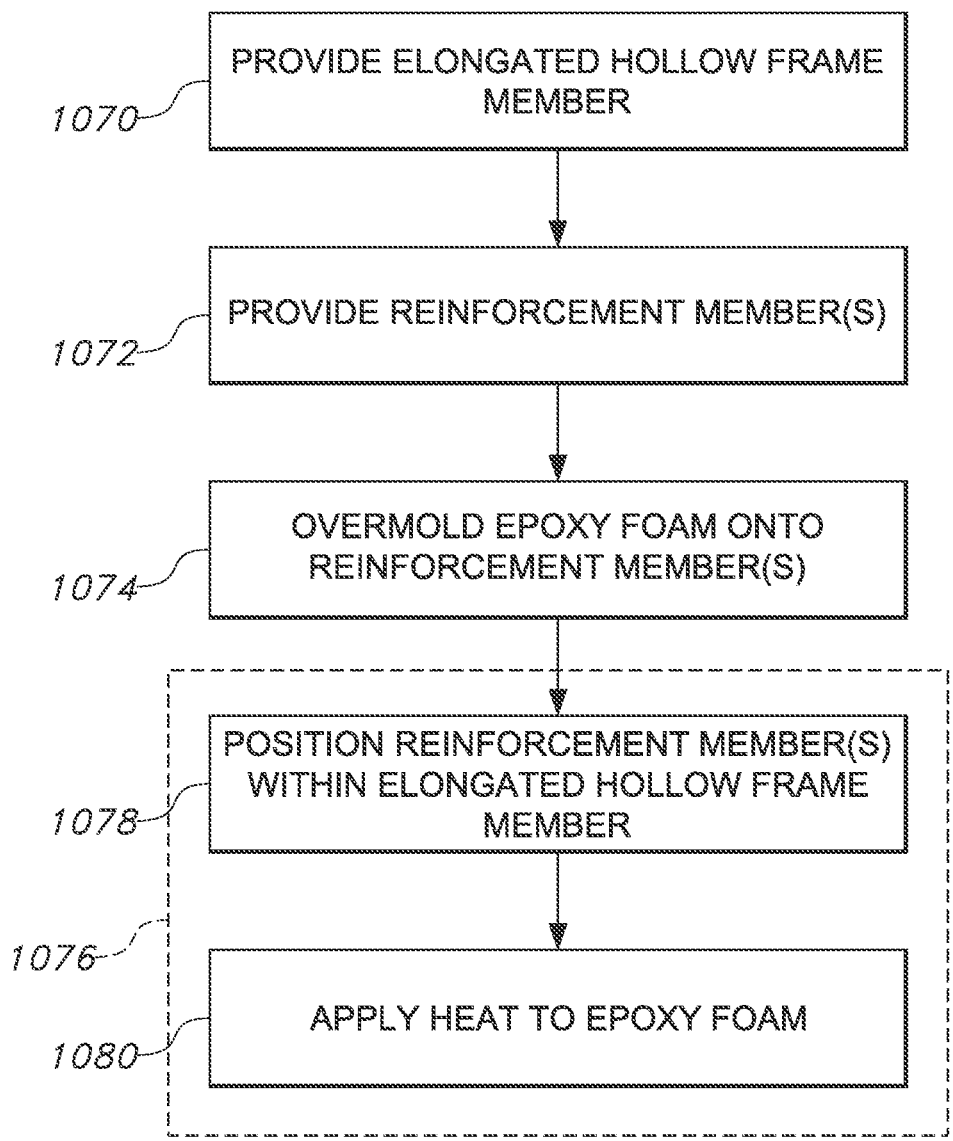
FIG. 19 is a schematic process flow diagram illustrating a vehicle frame construction method according to an exemplary embodiment.

With Reference to FIG. 19, a vehicle frame construction method will now be described. In particular, the method of FIG. 19 can be used with the vehicle frame construction 1010 described hereinabove with reference to FIGS. 13A-18B and will be described with reference thereto, though this is not required and other vehicle frame constructions can be used. In the method of FIG. 19, at 1070, an elongated hollow frame member having a plurality of interior sides is provided, which can be the elongated hollow frame member 1014. Next, at 1072, one or more reinforcement members formed from a thermoplastic polymer can be provided. In one embodiment, each reinforcement member provides is one of a plurality of like reinforcement members. For example, the reinforcement members 1020a, 1020b and 1020c can be provided and, as described above, each of these reinforcement members 1020a, 1020b and 1020c can be formed from a thermoplastic polymer (e.g., nylon or fiber-reinforced nylon).

Next, in 1074, an epoxy foam can be overmolded onto contact portions of the reinforcement member. For example, the structural foam 1024 in the form of strips 1024a-1024e can be overmolded onto the contact portions 1040, 1042, 1044 and 1046 of the reinforcement member 1020a. Optionally, step 1074 concerning overmolding can have already occurred in step 1072 (i.e., the provision of the reinforcement member 1020a in step 1072 can include providing the reinforcement member 1020a with the structural foam 1024 already overmolded thereon). Then, as shown at 1076, the reinforcement member or members can be installed within the elongated hollow frame member to reinforce each interior side of the hollow frame member in a plane orthogonally ranted relative to a longitudinal axis of the elongated hollow frame member. Such installing of the reinforcement member or members within the elongated hollow frame member at 1076 can include positioning the reinforcement member or members within the elongated hollow frame member as shown at 1078 and subsequently applying heat to the epoxy foam to expand the epoxy foam and bond contact portions of the reinforcement member or members to the elongated hollow frame member as shown at 1080.

Applied to the vehicle frame construction 1010, positioning the reinforcement members 1020a, 1020b, 1020c within the elongated hollow frame member 1014 can involve positioning the reinforcement members 1020a, 1020b, 1020c with the structural foam 1024 already overmolded thereon on one of the parts that comprise the frame member 1014 and then the other of the parts that comprise the frame member 1014 can be combined to enclose the reinforcement members 1020a, 1020b and 1020c. For example, the inner member 1028 can receive the reinforcement members 1020a, 1020b, 1020c thereon and then the outer member 1026 can be overlaid onto the inner member 1028 while enclosing the reinforcement members 1020a, 1020b, 1020c.

At this stage, and with reference to FIG. 18B, the structural foam 1024 has not yet had heat applied for heat activation thereof and thus does not fully function to reinforce the interior sides 1030, 1032, 1034, 1036 of the frame member 1014. In step 1080, however, when heat is applied to the epoxy foam (e.g., as the vehicle frame 1012 passes through various heating apparatus, e.g., ovens, to address surface finishing of the vehicle body), the structural foam 1024 expands and bonds the contact portions of the reinforcement members 1020a, 1020b, 1020c to the frame member 1014 as shown with respect to the reinforcement member 1020a in FIG. 18A. At this stage, the reinforcement members 1020a, 1020b, 1020c are each fully installed within the elongated hollow frame member 1014 and each interior side 1030, 1032, 1034, 1036 of the elongated hollow frame member 1014 is reinforced by each of the reinforcement members 1020a, 1020b, 1020c in the plane orthogonally oriented relative to the longitudinal axis 1022 of the elongated hollow frame member 1014.

Figure 20:
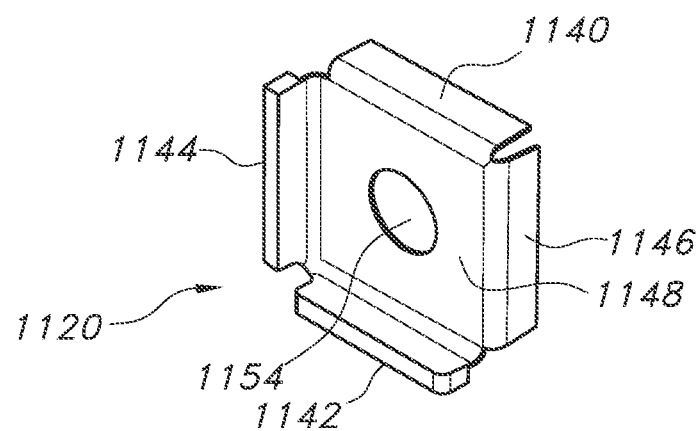
FIG. 20 is a perspective view of a reinforcement member according to an alternate exemplary embodiment.

With reference to FIG. 20, a reinforcement member 1120 is shown according to an alternate exemplary embodiment. In one exemplary application, the reinforcement member 1120 can be used in place of each of the reinforcement members 1020a, 1020b and 1020c described hereinabove in the vehicle frame construction 1010 and/or in the method of FIG. 19. Like the reinforcement members 1020a, 1020b, 1020c, the reinforcement member 1120 can have structural foam 1024 overmolded thereon, though this is not shown. The reinforcement member 1120 has contact portions that can be arranged adjacent each of the plurality of interior sides of the elongated hollow frame member 1014.

In particular, as shown, the contact portions of the reinforcement member 1120 can include an upper contact portion 1140 that can be complementarily arranged adjacent the upper side 1032 of the plurality of the interior sides of the elongated hollow frame member 1014 and a lower contact portion 1142 complementarily arranged adjacent a lower side 1030 of the plurality of interior sides of the elongated hollow frame member 1014 and spaced apart from the upper contact portion 1140. Additionally, the contact portions of the reinforcement member 1120 can include a first side contact portion 1142 that is complementarily arranged adjacent the first side 1034 of the plurality of interior sides of the elongated hollow frame member 1014 and oriented approximately perpendicularly relative to the upper contact portion 1140 and the lower contact portion 1142, and a second side contact portion 1146 that is complementarily arranged adjacent the second side 1036 of the plurality of interior sides of the elongated hollow frame member 1014 and oriented approximately perpendicularly relative to the upper contact portion 1140 and the lower contact portion 1142. As shown, the second side contact portion 1146 is also spaced apart from the first side contact portion 1142.

The reinforcement member 1120 further includes at least one support portion 1048 extending from the upper contact portion 1140 to the lower contact portion 1142 and extending from the first side contact portion 1144 to the second side contact portion 1146. In the illustrated embodiment, a throughole 1154 is defined in the at least one support portion 1148. In this embodiment, as shown, the at least one support portion 1148 is a single wall structure arranged approximately orthogonally relative to each of the upper contact portion 1140, the lower contact portion 1142, the first side contact portion 1144 and the second side contact portion 1146.

Additionally, and particular to the embodiment illustrated, at least two of the upper contact portion 1140, the lower contact portion 1142, the first side contact portion 1144 and the second side contact portion 1146 extend in a first direction away from the at least one support portion 1148 and the remaining two of the upper contact portion 1140, the lower contact portion 1142, the first side contact portion 1144 and the second side contact portion 1146 extended a second, opposite direction away from the at least one support portion. Also, the two extending in the first direction can be adjacent ones of the upper contact portion 1140, the lower contact portion 1142, the first contact portion 1144 and the second side contact portion 1146. For example, in the embodiment illustrated, the upper contact portion 1140 and the second side contact portion 1146 are shown extending in a first direction away from the at least one support portion 1148 and the lower contact portion 1142 and the first side contact portion 1144 extend in a second, opposite direction away from the at least one support portion 1148. That is, the portions 1140, 1146 extend in one direction away from the at least one support portion 1148 and the contact portions 1142, 1144 extend in a second opposite direction away from the at least one support portion 1148.

Figure 21:
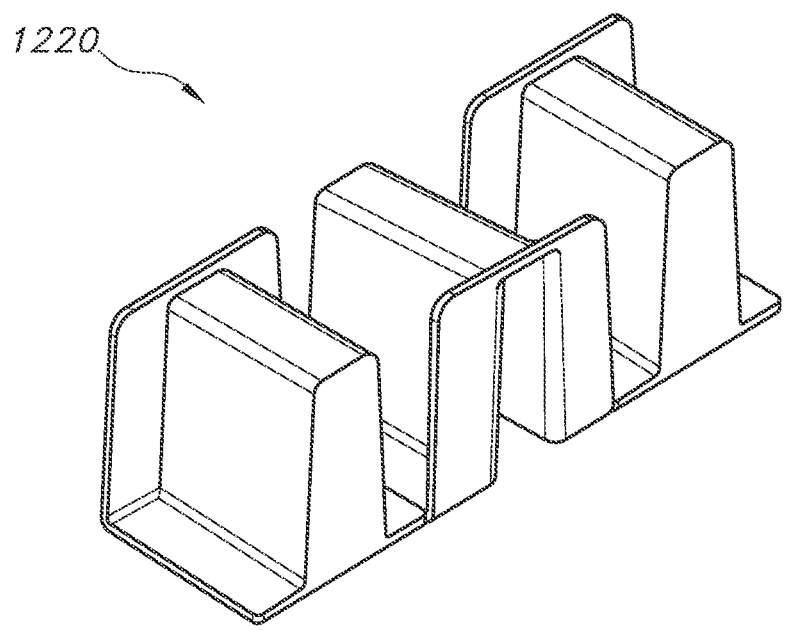
FIG. 21 is a perspective view of another reinforcement member according to another alternate exemplary embodiment.

With reference to FIG. 21, another alternate embodiment is shown. In this embodiment, an elongated reinforcement member 1220 is shown comprised of reinforcement members (e.g., reinforcement members 1020a, 1020b and 1020c) that are not spaced apart from one another, can be abutted adjacent one another and/or can be integrally formed and/or combined together. Accordingly, each reinforcement member or portion forming the reinforcement member 1220 can be one of a plurality of like reinforcement members arranged back-to-back without spacing therebetween. Such a reinforcement member 1220 can be used to provide reinforcing support within an elongated hollow frame member and can provide uniform support along an elongated extent or a portion of the elongated hollow frame member. For example, the reinforcement member 1220 can be used in place of the reinforcement members 1020a, 1020b and 1020c in the vehicle frame construction 1010 and/or in the method of FIG. 19.

With reference now to FIGS. 22 through 26, still another alternate embodiment is shown wherein vertical pillar member 2014 can be substituted for vehicle pillar member 14 of the vehicle frame 12 of the vehicle frame construction 10 shown in FIG. 1. Alternatively, or in addition, the member 2014 can be used as the side sill member 16 in FIG. 1 and/or for any other longitudinal frame member (e.g., the roof rail member 18 of FIG. 1). With additional reference to FIG. 22, the vehicle frame construction having the member 2014 can additionally include a structural foam member 2020 and an acoustic foam 2032.

Figure 22:
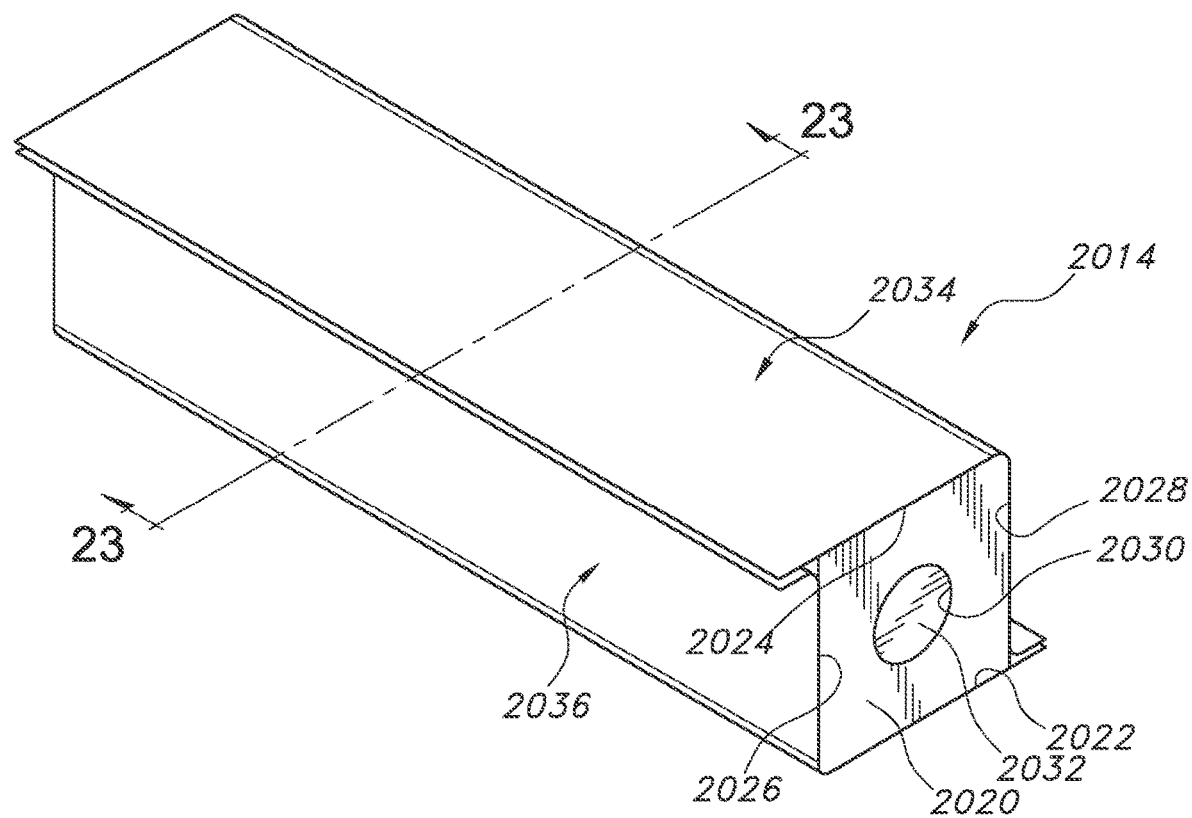
FIG. 22 is a schematic perspective view showing a portion of the pillar member of the vehicle frame of FIG. 1 according to an alternate exemplary embodiment wherein a structural foam member is installed within the pillar member and an acoustic foam is injected inside the structural foam member.
Figures 23, 25:
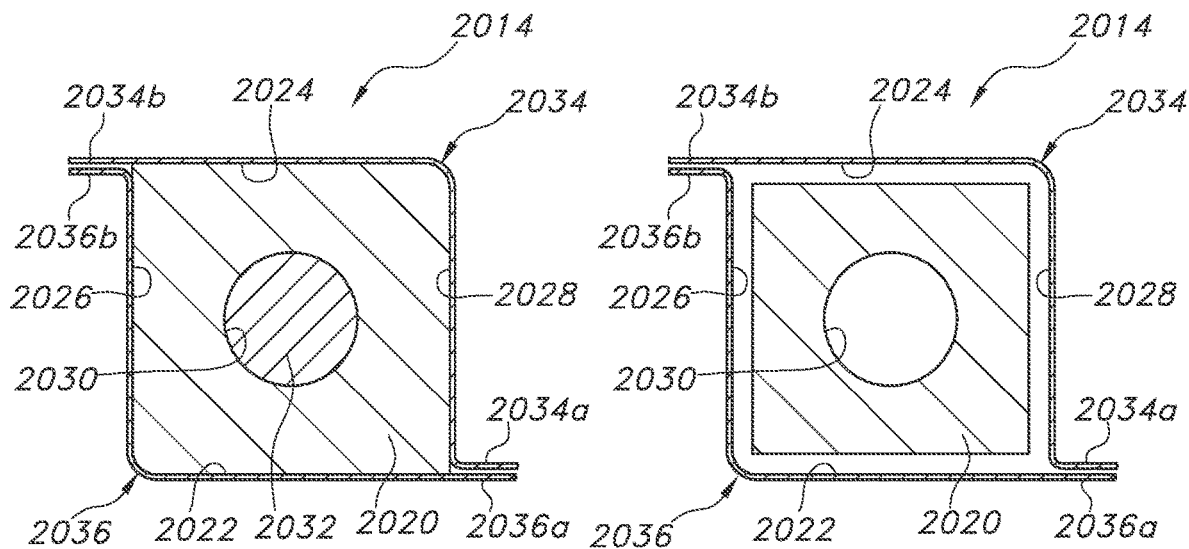
FIG. 23 is a cross-section view taken along the line 23-23 of FIG. 22.
FIG. 25 is a cross-sectional view similar to FIG. 23 but showing the structural foam member installed within the frame member prior to heat activation thereof and prior to injection molding of the acoustic foam therein.
Figure 24:
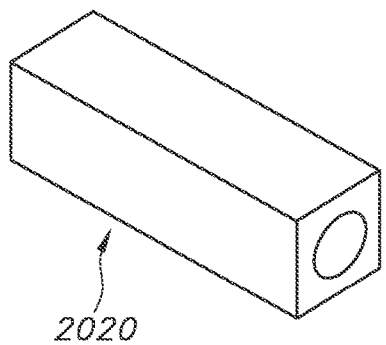
FIG. 24 is a perspective view of the structural foam member shown in isolation.

More particularly, the structural foam member 2020 is complementarily molded within the elongated hollow frame member 2014 to reinforce each interior side (e.g., sides 2022, 2024, 2026 and 2028 in the illustrated embodiment) of the elongated hollow frame member 2014. As shown in FIGS. 22 and 23, the structural foam member 2020 defines a longitudinal throughhole 2030, which has a cylindrical shape extending along an entire longitudinal extent of the structural foam member 2020 in the illustrated embodiment. The structural foam member 2020 is elongated in the embodiment shown and is disposed along a substantial portion of a longitudinal extent of the elongated hollow frame member 2014, though this is not required. In one embodiment, the structural foam member 2020 is formed of a heat curable foam material. This heat curable foam material can also be a heat activated expanding foam material. As shown, the acoustic foam 2032 can be injection molded within the longitudinal throughhole 2030 of the structural foam member 2020.

In the illustrated embodiment, the elongated hollow frame member 2014 is constructed so as to have four interior sides, though other configurations can be used. More particularly, as shown for the illustrated embodiment, the elongated hollow frame member 2014 includes an outer member 2034 having mating flanges 2034a, 2034b and an inner member 2036 having mating flanges 2036a, 2036b. The mating flanges 2034a, 2036a and 2034b, 2036b can be, respectively, laid against one another and welded or otherwise secured together as is known and understood by those skilled in the art to form the elongated hollow frame member 2014. By this construction, the plurality of interior sides of the elongated hollow frame member 2014 includes at least four sides arranged in a rectangular configuration wherein adjacent sides are approximately perpendicularly oriented relative to one another. In the illustrated embodiment, the sides 2022, 2026 are provided by the inner member 2028 and the sides 2024, 2028 are provided by the outer member 2026.

Figure 26:
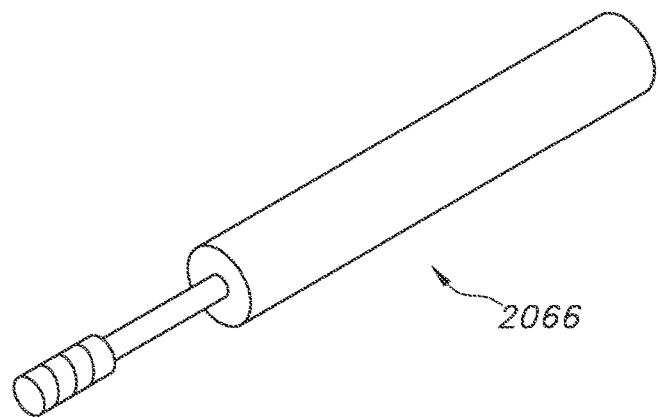
FIG. 26 is a schematic perspective view of a temporary fill member for maintaining the integrity of the longitudinal throughole in the structural foam member during heat activation thereof.

As shown in FIG. 26B, the structural foam member 2020 initially has a cross-section that is smaller than an interior cross-section of the elongated hollow frame member 2014. However, after heat activation, the structural foam member 2020 expands within the elongated hollow frame member 2014 to fill the interior cross-section and bonds to the sides 2022, 2024, 2026, 2028 defining the interior cross-section of the elongated hollow frame member 2014, as shown in FIG. 26A. By this arrangement, the structural foam member 2020 reinforces each interior side 2022, 2024, 2026, 2028 of the elongated hollow frame member 2014 in a plane orthogonally oriented relative to a longitudinal axis of the elongated hollow frame member. With brief reference to FIG. 26, a temporary fill member 2066 can be inserted into the longitudinal throughhole 2030 during heat activation of the elongated hollow frame member 2014 to maintain the integrity of the longitudinal throughhole 2030 (i.e., prevent the structural foam member 2020 from closing or significantly collapsing the longitudinal throughhole 2030 during heat activation). The temporary fill member 2066 can be removed after heat activation and curing of the structural foam member and then the acoustic foam 2032 can be injection molded into the longitudinal throughhole 2030.

While in the illustrated embodiment, the cross-section of the elongated hollow frame member 2014 is shown as being constant or uniform in FIG. 22, it is to be appreciated that in actual application on the vehicle frame 2012 that the elongated hollow frame member 2014 can have a varying cross-section. For example, the cross-section can vary along a longitudinal portion of the elongated hollow frame member 2014. The structural foam member 2020 can be complementarily molded within the longitudinal portion having a varying cross-section in the same manner as described herein with reference to the illustrated embodiment. The expansion of the structural foam member can fill any voids between the structural foam member and the elongated hollow frame member whether or not the cross-section is uniform. Alternatively, the structural foam member 2020 can have be shaped to have a varying cross section that corresponds to that of the elongated hollow frame member 2014.

Figure 27:
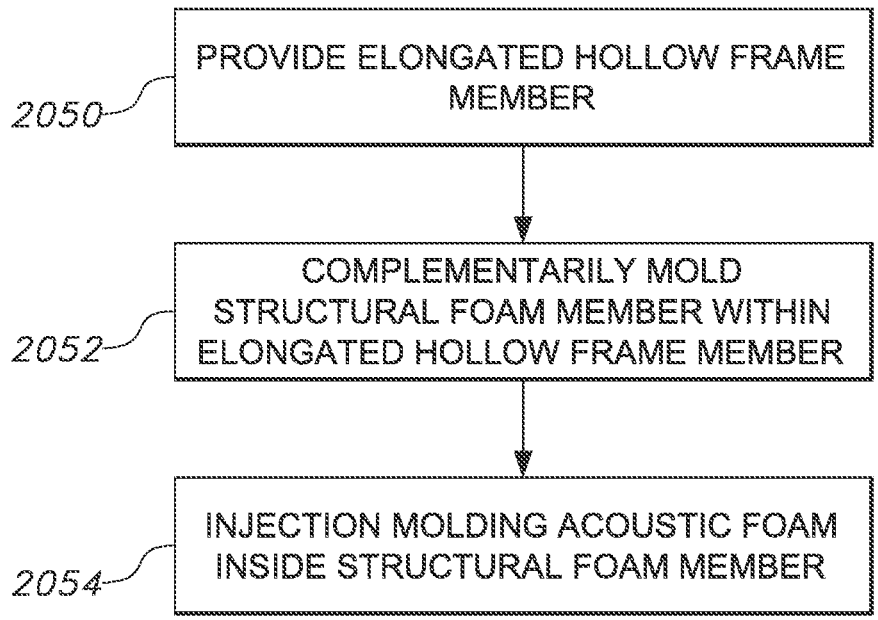
FIG. 27 is a schematic process flow diagram illustrating a vehicle frame construction method according to an exemplary embodiment.

With reference now to FIG. 27, a vehicle frame construction method will be described and, in particular, will be described in association with the vehicle frame construction described hereinabove in reference to FIGS. 22-26, though it is to be appreciated by those skilled in the art that other frame constructions could be used in the method. In the illustrated method, at 2050, an elongated hollow frame member having a plurality of interior sides is provided, which can be the elongated hollow frame member 2014. Alternatively, the elongated hollow frame member can be some other hollow frame member of the vehicle frame 2012, such as the side sill member 2016 or the roof rail member 2018, for example.

Next, as indicated at 2052, a structural foam member is complementarily molded within the elongated hollow frame member provided in step 2050 to reinforce each interior side of the elongated hollow frame member. The structural foam member can define a longitudinal throughhole adapted for receipt of injection molded acoustic foam. In the vehicle frame construction 2010, the structural foam member can be the structural foam member 2020 defining the longitudinal throughhole 2030. Once the structural foam member 2020 is complementarily molded within the elongated hollow frame member 2014 to reinforce each interior side 2022, 2024, 2026, 2028 of the elongated hollow frame member 2014, the acoustic foam 2032 can be injection molded within the longitudinal throughhole 2030 of the structural foam member 2020 as indicated at 2054.

Figure 28:
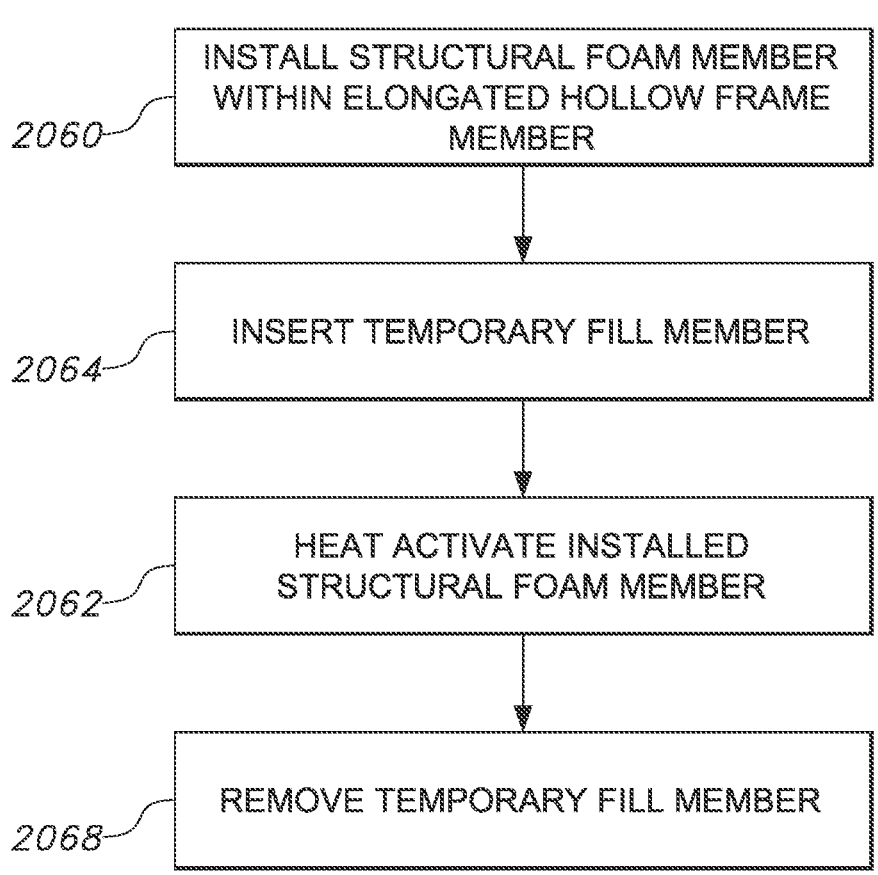
FIG. 28 is a schematic process flow diagram illustrating further steps for the method of FIG. 27.

With additional reference to FIG. 28, the step 2052 of complementarily molding the structural foam member can include installing the structural foam member within the elongated hollow frame member (step 2060) and heat activating the structural foam member to expand the structural foam member into complementarily engaging the elongated hollow frame member after installing the structural foam member (step 2062). Applied to the vehicle frame construction 2010, the structural foam member 2020 is first installed within the elongated hollow frame member 2014. In particular, with reference to FIG. 24, the structural foam member can be formed of a predefined shape and can be installed into the elongated hollow frame member 2014. In one embodiment, the structural foam member 2020 is laid onto the inner member 2036 and then is enclosed within the elongated hollow frame member 2014 by overlaying the outer member 2034 onto the inner member 2036 when forming the elongated hollow frame member 2014.

In particular, as shown in FIG. 25, the structural foam member 2032 can have a cross-section that is smaller than an internal cross-section formed by the sides 2022, 2024, 2026, 2028 of the elongated hollow frame member 2014. After installation, the structural foam member 2020 is heat activated to expand the structural foam member into complementarily engaging the elongated hollow frame member 2014 as shown in FIGS. 22 and 23. In particular, heat activation of the structural foam member 2020 causes expansion of the structural foam member 2020 and causes the structural foam member 2020 to bond to the sides 2022, 2024, 2026 and 2028 of the elongated hollow frame member 2014. Heat activating of the structural foam member 2020 within the elongated hollow frame member 2014 complementarily expands the structural foam member 2020 into engagement with the elongated hollow frame member 2014. After such engagement, the structural foam member 2020 is cured (e.g., via cooling). Such curing can occur after heat activation and prior to injection molding of the acoustic foam 2032.

In addition, the step 2052 of complementarily molding the structural foam member within the elongated hollow frame member can further include inserting a temporarily fill member 2066 (FIG. 26) within the structural foam member 2020 prior to heat activating the structural foam member 2020 to inhibit filling of the longitudinal throughhole 2030 (step 2064). After heat activation of the installed structural foam member 2020, the temporary fill member 2066 can be removed as indicated at 2068 to enable injection molding of the acoustic foam 2032 within the longitudinal throughhole 2030 in step 2054. As shown in FIG. 26, in one exemplary embodiment, the temporary fill member 2066 is a dowel member. This dowel member 2066 can be coated with a non-stick material to facilitate removal of the dowel member 2066 after heat activation of the structural foam member 2020.

In all the embodiments shown and/or described herein, significant advantages are provided in the vehicle frame constructions, particularly as relates to increasing the maximum load for a particular vehicle frame component and/or increasing the maximum amount of energy absorption as compared to the weight increase for the vehicle frame component when the maximum load and/or maximum amount of energy absorption is increased. More specifically, the vehicle frame constructions of the subject disclosure provide an improved loading ratio, wherein the loading ratio is defined as the yield load (e.g., kN) per unit weight. Likewise, the vehicle frame constructions of the subject disclosure provide an improved energy ratio, wherein the energy ratio is defined as the energy absorbed (KN-mm) per unit weight. This is in contrast to some conventional techniques for improving yield load and/or energy absorption whereby additional structural reinforcements are added (e.g., steel or aluminum brackets) that do improve yield load and/or energy absorption but simultaneously (and undesirably) increase the weight of the frame component.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle frame construction, comprising:
an elongated hollow frame member having a plurality of interior sides; and
a reinforcement member formed from a thermoplastic polymer and arranged within the elongated hollow frame member to reinforce each interior side of the elongated hollow frame member in a plane orthogonally oriented relative to a longitudinal axis of the elongated hollow frame member,
wherein the reinforcement member has contact portions arranged adjacent each of the plurality of interior sides and structural foam is interposed between each contact surface and an adjacent interior side of the plurality of interior sides of the elongated hollow frame member,
wherein the contact portions include:
an upper contact portion complementarily arranged adjacent an upper side of the plurality of interior sides of the elongated hollow frame member;
a lower contact portion complementarily arranged adjacent a lower side of the plurality of interior sides of the elongated hollow frame member and spaced apart from the upper contact portion;
a first side contact portion complementarily arranged adjacent a first side of the plurality of interior sides of the elongated hollow frame member; and
a second side contact portion complementarily arranged adjacent a second side of the plurality of interior sides of the elongated hollow frame member and spaced apart from the first side contact portion,
wherein the reinforcement member further includes at least one support portion extending from the upper contact portion to the lower contact portion and also extending from the first side contact portion to the second side contact portion.

2. The vehicle frame construction of claim 1 wherein structural foam is interposed between the reinforcement member and the elongated hollow frame member.

3. The vehicle frame construction of claim 2 wherein the structural foam is interposed between the reinforcement member and each interior side of the elongated hollow frame member.

4. The vehicle frame construction of claim 3 wherein the structural foam is overmolded onto the reinforcement member.

5. The vehicle frame construction of claim 3 wherein the structural foam is a heat activated epoxy foam.

6. The vehicle frame construction of claim 1 wherein the structural foam is overmolded onto the reinforcement member.

7. The vehicle frame construction of claim 1 wherein the structural foam is a heat activated epoxy foam.

8. The vehicle frame construction of claim 1 wherein the plurality of interior sides includes at least four sides arranged in two sets including a first set of spaced apart sides and a second set of spaced apart sides arranged approximately perpendicularly relative to the first set of spaced apart sides.

9. The vehicle frame construction of claim 1 wherein each contact surface extends along substantially an entirety of the adjacent interior side.

10. The vehicle frame construction of claim 1 wherein a throughole is defined in the at least one support portion.

11. The vehicle frame construction of claim 1 wherein the at least one support portion is a single wall structure arranged approximately orthogonally relative to each of the upper contact portion, the lower contact portion, the first side contact portion and the second side contact portion, and wherein two of the upper contact portion, the lower contact portion, the first side contact portion and the second side contact portion extend in a first direction away from the at least one support portion and the remaining two of the upper contact portion, the lower contact portion, the first side contact portion and the second side contact portion extend in a second, opposite direction away from the at least one support portion.

12. The vehicle frame construction of claim 11 wherein said two extending in the first direction are adjacent ones of the upper contact portion, the lower contact portion, the first side contact portion and the second side contact portion.

13. The vehicle frame construction of claim 1 wherein the at least one support portion is formed of a pair of support legs arranged in spaced apart relation relative to one another.

14. The vehicle frame construction of claim 13 wherein the lower contact portion is formed of a pair of flanges including a first flange extending from a first one of the pair of support legs and a second flange extending from a second one of the pair of support legs.

15. The vehicle frame construction of claim 13 wherein the first side contact portion is formed of a pair of flanges including a first side flange extending from a first one of the pair of support legs and a second side flange extending from a second one of the pair of support legs, and wherein the second side contact portion extending between the support legs.

16. The vehicle frame construction of claim 1 wherein the reinforcement member is one of a plurality of like reinforcement members disposed at spaced apart locations along a longitudinal extent of the elongated frame member.

17. The vehicle frame construction of claim 1 wherein the reinforcement member is one of a plurality of like reinforcement members arranged back-to-back without spacing therebetween.

18. The vehicle frame construction of claim 1 wherein the thermoplastic polymer is one of nylon or fiber-reinforced nylon.

19. A vehicle frame member assembly, comprising:
an elongated hollow frame member; and
a plurality of identically shaped nylon reinforcement members arranged in a spaced apart pattern within the elongated hollow frame member to reinforce each interior side of the elongated hollow frame member in a plane orthogonally oriented relative to a longitudinal axis of the elongated hollow frame member, each of the reinforcement members having contact portions arranged adjacent each of the plurality of interior sides, the contact portions including upper and lower contact portions and first and second side contact portion, and each of the reinforcement members includes a support wall structure that is distinct from the contact portions and that interconnects at least two of the contact portions, wherein one of the at least two contact portions is defined by a flange extended from the support wall structure.

20. A vehicle frame construction method, comprising:
providing an elongated hollow frame member having a plurality of interior sides;
providing a reinforcement member formed from a thermoplastic polymer; and
installing the reinforcement member within the elongated hollow frame member to reinforce each interior side of the elongated hollow frame member in a plane orthogonally oriented relative to a longitudinal axis of the elongated hollow frame member, the reinforcement member having contact portions arranged adjacent each of the plurality of interior sides and at least one support member distinct from the contact portions and interconnecting the contact portions.

21. The vehicle frame construction method of claim 20 further including:
overmolding an epoxy foam onto the contact portions of the reinforcement member;
applying heat to the epoxy foam to expand the epoxy foam and bond the contact portions of the reinforcement member of the elongated hollow frame member.

* * * * *